United States Patent
Sharifi et al.

(10) Patent No.: US 12,386,493 B2
(45) Date of Patent: Aug. 12, 2025

(54) UNDOING APPLICATION OPERATION(S) VIA USER INTERACTION(S) WITH AN AUTOMATED ASSISTANT

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/594,926

(22) Filed: Mar. 4, 2024

(65) Prior Publication Data

US 2024/0211120 A1 Jun. 27, 2024

Related U.S. Application Data

(63) Continuation of application No. 17/157,178, filed on Jan. 25, 2021, now Pat. No. 11,947,783.

(51) Int. Cl.
*G06F 3/04842* (2022.01)
*G06F 3/01* (2006.01)
(Continued)

(52) U.S. Cl.
CPC .......... *G06F 3/04842* (2013.01); *G06F 3/016* (2013.01); *G06F 3/0481* (2013.01);
(Continued)

(58) Field of Classification Search
CPC .... G06F 3/04842; G06F 3/016; G06F 3/0481; G06F 3/167; G10L 15/22; G10L 2015/223
See application file for complete search history.

(56) References Cited

U.S. PATENT DOCUMENTS 5,231,670 A * 7/1993 Goldhor ............ G06F 3/16
704/E15.045
5,819,243 A * 10/1998 Rich ............ G06F 9/451
706/11
(Continued)

FOREIGN PATENT DOCUMENTS

EP 2343643 7/2011
JP 2018525653 9/2018
(Continued)

OTHER PUBLICATIONS

European Patent Office; International Search Report and Written Opinion of Application No. PCT/US2021/061995; 17 pages; dated Mar. 7, 2022.
(Continued)

*Primary Examiner* — Jeremy L Stanley
(74) *Attorney, Agent, or Firm* — Gray Ice Higdon

(57) ABSTRACT

Implementations set forth herein relate to an automated assistant that can perform operations to revert various applications to prior states that the applications may have arrived at via certain user inputs. The user can provide a spoken utterance such as, "undo," in order to cause the automated assistant to identify a particular application that the user may want to affect with the "undo" command. When the particular application is identified, the automated assistant can identify one or more operations recently performed using the particular application. In some implementations, the automated assistant can provide the user with a variety of undo options in response to an "undo" command. For instance, the automated assistant can prompt the user to select one of a first cluster of operations and/or a second cluster of operations to be undone, and each cluster can refer to different operations.

12 Claims, 11 Drawing Sheets

(51) Int. Cl.
  *G06F 3/0481* (2022.01)
  *G06F 3/16* (2006.01)
  *G10L 15/22* (2006.01)
(52) U.S. Cl.
  CPC .............. *G06F 3/167* (2013.01); *G10L 15/22*
    (2013.01); *G10L 2015/223* (2013.01)

(56) References Cited

U.S. PATENT DOCUMENTS

| | | | |
|---|---|---|---|
| 6,111,575 A * | 8/2000 | Martinez | G06F 9/45512 |
| | | | 715/236 |
| 6,581,033 B1 * | 6/2003 | Reynar | G10L 15/22 |
| | | | 704/E15.04 |
| 7,415,100 B2 * | 8/2008 | Cooper | G10L 13/00 |
| | | | 704/E15.045 |
| 7,536,672 B1 * | 5/2009 | Ruehle | G06F 9/4493 |
| | | | 717/102 |
| 8,930,820 B1 * | 1/2015 | Elwell | G09D 3/12 |
| | | | 715/963 |
| 9,257,133 B1 * | 2/2016 | Strand | G10L 17/26 |
| 9,342,510 B1 * | 5/2016 | Mohr | G06F 16/219 |
| 9,741,343 B1 * | 8/2017 | Miles | G10L 15/26 |
| 9,847,079 B2 * | 12/2017 | Clement | G10H 1/14 |
| 9,911,418 B2 * | 3/2018 | Chi | G06T 11/60 |
| 9,959,129 B2 * | 5/2018 | Kannan | G10L 15/22 |
| 10,063,603 B2 * | 8/2018 | Nelson | G06F 40/166 |
| 10,254,930 B2 * | 4/2019 | Raskin | G06F 3/038 |
| 10,496,705 B1 * | 12/2019 | Irani | G06F 16/90328 |
| 10,530,598 B2 * | 1/2020 | Ansari | H04L 67/141 |
| 10,572,821 B1 * | 2/2020 | Gauf | G06F 9/4881 |
| 10,779,085 B1 * | 9/2020 | Carrigan | H04L 12/2816 |
| 10,971,158 B1 * | 4/2021 | Patangay | H04L 67/10 |
| 10,977,155 B1 * | 4/2021 | Muras | G06F 11/3608 |
| 11,075,975 B2 * | 7/2021 | Gupta | G06Q 30/06 |
| 11,182,178 B1 * | 11/2021 | Singh | G06F 9/451 |
| 11,232,136 B2 | 1/2022 | Aggarwal et al. | |
| 11,308,272 B1 * | 4/2022 | Sturms | G06F 40/166 |
| 2002/0156816 A1 * | 10/2002 | Kantrowitz | G06F 40/253 |
| | | | 715/256 |
| 2006/0143239 A1 * | 6/2006 | Battat | G06F 16/24552 |
| 2008/0162549 A1 * | 7/2008 | Foti | G06F 9/4493 |
| 2008/0189646 A1 * | 8/2008 | Bohle | G06F 8/65 |
| | | | 711/E12.001 |
| 2008/0235142 A1 * | 9/2008 | Gonze | G06F 21/10 |
| | | | 705/59 |
| 2008/0235580 A1 * | 9/2008 | Gonze | G06F 9/451 |
| | | | 715/700 |
| 2008/0235588 A1 * | 9/2008 | Gonze | G06F 16/748 |
| | | | 715/202 |
| 2009/0132918 A1 * | 5/2009 | Deyo | G06Q 10/06 |
| | | | 715/705 |
| 2009/0183208 A1 * | 7/2009 | Christensen | H04N 21/25866 |
| | | | 725/58 |
| 2011/0161883 A1 * | 6/2011 | Kennedy | G06Q 50/01 |
| | | | 715/835 |
| 2011/0252351 A1 * | 10/2011 | Sikora | G06Q 10/109 |
| | | | 715/764 |
| 2012/0036324 A1 * | 2/2012 | Grunberger | G06F 9/451 |
| | | | 711/E12.016 |
| 2012/0047434 A1 * | 2/2012 | Ginetti | G06F 40/166 |
| | | | 715/255 |
| 2013/0254139 A1 * | 9/2013 | Lei | G06N 5/02 |
| | | | 706/11 |
| 2014/0365895 A1 * | 12/2014 | Magahern | G06F 3/04842 |
| | | | 715/762 |
| 2015/0074059 A1 * | 3/2015 | Bilinski | G06F 16/40 |
| | | | 707/649 |
| 2015/0153929 A1 * | 6/2015 | Bernstein | G06F 3/0486 |
| | | | 715/781 |
| 2015/0213355 A1 * | 7/2015 | Sharma | G10L 15/22 |
| | | | 706/11 |
| 2016/0173578 A1 * | 6/2016 | Sharma | H04L 51/00 |
| | | | 709/203 |
| 2016/0189717 A1 * | 6/2016 | Kannan | G10L 15/22 |
| | | | 704/275 |
| 2016/0203002 A1 * | 7/2016 | Kannan | G06F 3/162 |
| | | | 715/708 |
| 2016/0216794 A1 * | 7/2016 | Yoon | G06F 3/04166 |
| 2016/0239259 A1 * | 8/2016 | Lenchner | G10L 15/1822 |
| 2016/0335138 A1 * | 11/2016 | Surti | G06F 9/44526 |
| 2016/0360382 A1 * | 12/2016 | Gross | G06F 9/445 |
| 2017/0031770 A1 * | 2/2017 | Breedvelt-Schouten | |
| | | | G06F 3/0484 |
| 2017/0263248 A1 * | 9/2017 | Gruber | G06F 40/166 |
| 2017/0289168 A1 * | 10/2017 | Bar | H04L 63/1408 |
| 2017/0357716 A1 * | 12/2017 | Bellegarda | G06F 16/345 |
| 2017/0358305 A1 * | 12/2017 | Kudurshian | G10L 15/22 |
| 2017/0371885 A1 * | 12/2017 | Aggarwal | G06F 9/453 |
| 2018/0012195 A1 * | 1/2018 | Nagaraj | G06Q 10/1095 |
| 2018/0121432 A1 * | 5/2018 | Parson | G06F 16/635 |
| 2018/0139507 A1 * | 5/2018 | Toksoz | H04L 65/762 |
| 2018/0247654 A1 * | 8/2018 | Bhaya | G06F 40/205 |
| 2018/0332169 A1 * | 11/2018 | Somech | H04L 67/55 |
| 2018/0336045 A1 * | 11/2018 | Badr | G06N 20/00 |
| 2019/0073998 A1 * | 3/2019 | Leblang | G06F 16/3344 |
| 2019/0079787 A1 * | 3/2019 | Toksoz | G06F 9/452 |
| 2019/0079935 A1 * | 3/2019 | Levy | G06N 3/045 |
| 2019/0103104 A1 * | 4/2019 | Nicholls | G06F 40/35 |
| 2019/0114672 A1 * | 4/2019 | Jacobs | G06Q 30/0269 |
| 2019/0116218 A1 * | 4/2019 | Gupta | H04L 67/02 |
| 2019/0129938 A1 * | 5/2019 | Yao | H04L 12/282 |
| 2019/0138197 A1 * | 5/2019 | Corrado | G06F 3/04883 |
| 2019/0163612 A1 * | 5/2019 | Michalski | G06F 11/3688 |
| 2019/0189118 A1 * | 6/2019 | Piernot | G10L 15/22 |
| 2019/0243669 A1 * | 8/2019 | Gupta | G10L 15/26 |
| 2019/0268632 A1 * | 8/2019 | Foerster | H04N 21/44213 |
| 2019/0341010 A1 * | 11/2019 | Wipperfürth | G10H 1/0008 |
| 2019/0361575 A1 * | 11/2019 | Ni | G10L 15/22 |
| 2019/0384699 A1 * | 12/2019 | Arbon | G06N 3/006 |
| 2019/0391716 A1 * | 12/2019 | Badr | G08C 17/02 |
| 2020/0004808 A1 * | 1/2020 | Yao | G06N 20/00 |
| 2020/0065320 A1 * | 2/2020 | Lee | G06F 16/173 |
| 2020/0082821 A1 * | 3/2020 | Kosub | G06F 3/167 |
| 2020/0135187 A1 | 4/2020 | Chao | |
| 2020/0150934 A1 * | 5/2020 | Webster | G10L 15/063 |
| 2020/0175976 A1 * | 6/2020 | Rakshit | H04L 67/125 |
| 2020/0220914 A1 * | 7/2020 | Carrigan | G06F 3/04883 |
| 2020/0285353 A1 * | 9/2020 | Rezazadeh Sereshkeh | |
| | | | G06F 9/453 |
| 2020/0310749 A1 * | 10/2020 | Miller | G06F 3/167 |
| 2020/0319917 A1 * | 10/2020 | Ni | G06F 9/4812 |
| 2020/0353363 A1 * | 11/2020 | Slovak | A63F 13/355 |
| 2020/0372105 A1 * | 11/2020 | Gerges | G06F 40/232 |
| 2020/0379730 A1 * | 12/2020 | Graham | G06F 3/04883 |
| 2020/0380973 A1 * | 12/2020 | Novitchenko | G06F 40/35 |
| 2020/0402036 A1 * | 12/2020 | Doka | G06Q 20/10 |
| 2020/0410392 A1 * | 12/2020 | Verma | G06N 3/044 |
| 2021/0012155 A1 * | 1/2021 | Vu | G06F 18/2132 |
| 2021/0020163 A1 | 1/2021 | Leblang | |
| 2021/0081294 A1 * | 3/2021 | Golubev | G06F 18/214 |
| 2021/0117624 A1 * | 4/2021 | Aghajanyan | G06F 40/295 |
| 2021/0184881 A1 * | 6/2021 | Nadathur | H04L 12/2816 |
| 2021/0227049 A1 * | 7/2021 | Demiralp | G01S 13/882 |
| 2021/0233522 A1 * | 7/2021 | Kikin-Gil | G10L 15/22 |
| 2021/0304449 A1 * | 9/2021 | Mourkogiannis | G06T 11/60 |
| 2021/0333983 A1 * | 10/2021 | Singh | G06F 8/38 |
| 2021/0350201 A1 * | 11/2021 | Yao | G06F 40/166 |
| 2021/0352099 A1 * | 11/2021 | Rogers | G06N 20/00 |
| 2021/0389869 A1 * | 12/2021 | Deets | G06F 3/0488 |
| 2022/0012166 A1 * | 1/2022 | Lin | G06F 11/3438 |
| 2022/0036883 A1 * | 2/2022 | Tran | G06F 40/30 |
| 2022/0083211 A1 * | 3/2022 | Nefulda | G06F 3/016 |
| 2022/0229671 A1 * | 7/2022 | Nadathur | H04M 1/72409 |
| 2022/0236857 A1 | 7/2022 | Sharifi et al. | |
| 2022/0308195 A1 * | 9/2022 | Zeng | G01S 13/003 |

(56) References Cited

U.S. PATENT DOCUMENTS

2022/0308680 A1* 9/2022 Sternberg ............... G06F 3/017
2022/0394101 A1* 12/2022 Feinmesser ........... H04L 67/535

FOREIGN PATENT DOCUMENTS

| JP | 2020528585 | 9/2020 |
|----|------------|--------|
| WO | 2006051965 | 5/2006 |
| WO | 2016190950 | 12/2016 |

OTHER PUBLICATIONS

Nuance; Take it back; https://www.nuance.com/products/help/dragon/dragon-for-mac6/enx/Content/Correction/TakeBack.htm; 2 pages; retrieved from internet Jan. 28, 2021.
Nuance; Dictation Basics; https://www.nuance.com/products/help/dragon/dragon-for-pc/enx/professionalgroup/main/Content/Dictation/basic_dictation.htm; retrieved from internet Jan. 28, 2021.
Japanese Patent Office; Notice of Reasons for Rejection issue in Application No. 2022-578717; 6 pages; dated Mar. 25, 2024.
European Patent Office; Communication pursuant to Article 94(3) EPC issued in Application No. 21835081.7; 5 pages; dated Dec. 10, 2024.
Intellectual Property India; Examination Report issued in Application No. 202227070366; 8 pages; dated Mar. 5, 2025.
Korean Patent Office; Notice of Office Action issued in Application No. 10-2023-7008598; 22 pages; dated Apr. 17, 2027.

\* cited by examiner

UNDOING APPLICATION OPERATION(S) VIA USER INTERACTION(S) WITH AN AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests by providing spoken natural language input (i.e., utterances) which may in some cases be converted into text and then processed, and/or by providing textual (e.g., typed) natural language input that can be processed.

In some instances, a user may interact with an application to perform certain operations such as editing a document, playing music, searching the internet, among many other operations. Some applications may provide features that allow a user to undo actions performed by the application. For example, a user can manually interact with an application to revert the application from a current state of the application to a prior state of the application. Although a user can employ an automated assistant to cause an application to perform certain operations to arrive at the current state, each operation may need to be manually undone at an interface of the application to revert to the prior state. For instance, when the user is interacting with an application via an assistant-enabled device (e.g., a standalone speaker device), reverting to a prior state in this way may necessitate that a user initializes the application at a different device (e.g., a laptop). This can waste power and other resources, such as network bandwidth, which can be increasingly consumed as additional devices are activated on a given network.

SUMMARY

Implementations set forth herein relate to an automated assistant that can perform undo operations for a variety of different applications and/or smart devices. The undo operations can reduce a number of operations that a user would otherwise manually perform at a computing device, thereby preserving computational resources. For instance, an automated assistant that performs undo operations can reduce an amount of time that a user would have to spend manually interacting with an application via an application interface and/or a quantity of inputs that the user would have to provide by interacting with the application, thereby reducing power consumption. Furthermore, employing an automated assistant with robust features for reverting application and/or smart device states can allow a user to more readily receive desired outputs from their applications and/or to have desired actions performed using their applications, without having to provide numerous clarifying inputs. This can additionally or alternatively preserve processing bandwidth that may otherwise be consumed when a user exclusively relies on manual user inputs to achieve a particular application state.

In some implementations, the automated assistant can operate to enable an "undo" command when one or more conditions are satisfied, thereby limiting instances in which an "undo" operation is accidentally triggered. For example, the automated assistant can enable the undo command when, with prior permission from the user, the automated assistant determines that the user is causing an application to perform one or more operations to control the application and/or a device associated with the application. The application can be, but is not limited to, a document editing application, a music application, a text messaging application, an email application, a contacts application, a calendar application, a reminders application, a smart device application that is associated with one or more smart devices that are included in an ecosystem of smart devices associated with a user and that are can be controlled by the automated assistant (e.g., smart light(s), a smart thermostat, a smart appliance, a smart TV, a smart speaker, and/or any other Internet of things (IoT) device), and/or any other application that is accessible by computing device(s) of a user and that also provides access to the automated assistant. Further, the user (or the automated assistant on behalf of the user) can interact with the application to cause the application and/or a device associated with the application to transition through various states. For instance, in implementations where the application is the document editing application, adding, removing, or modifying text of a document can correspond to the application transitioning through various states. As another example, in implementations where the application is the smart device application, changing a state of a corresponding smart device can correspond to the application and/or the smart device transitioning through various states. Also, for instance, in implementations where the application is the calendar or reminders application, adding, removing, or modifying text of an entry can correspond to the application transitioning through various states.

For example, assume the user is editing a document via the document editing application and performs a variety of different edits for a few hours to a draft document. Further assume the user determines, based on feedback received from a colleague, that the draft document should not include some of the most recent edits and, in response, the user invokes the automated assistant to undo those most recent edits. In this example, the user can provide a spoken utterance such as, "Undo," in order to invoke the automated assistant to initialize an undo operation. In response to receiving the spoken utterance, the automated assistant can determine that the user is invoking the automated assistant to undo one or more operations that have been performed with respect to the document. Further, the automated assistant can identify one or more particular applications that the user may be referring to (e.g., the document editing application) and/or one or more operations that the user may be referring to (e.g., those most recent edits).

As another example, assume the user provides a spoken utterance including the command "turn on the kitchen lights and dim them to 50%" that causes smart lights in the kitchen to transition from an "off" state to an "on" state, and then causes the intensity of the smart lights to be set at 50% intensity. Further assume the user provides an additional spoken utterance such as, "Undo," in order to invoke the automated assistant to initialize an undo operation. In response to receiving the additional spoken utterance, the automated assistant can determine that the user is invoking the automated assistant to undo one or more operations that have been performed with respect to the smart lights. Further, the automated assistant can identify one or more particular applications that the user may be referring to (e.g., the smart lights application) and/or one or more operations that the user may be referring to (e.g., turning on the smart lights and/or dimming the smart lights). In this example, the automated assistant may determine that "Undo" simply refers to undoing the "dimming" of the smart lights, and the automated assistant can cause the smart lights to be reverted back to a previous intensity. Additionally, or alternatively, the automated assistant may determine that "Undo" refers to undoing both "turning on" the smart lights and the "dimming" of the smart lights. In this example, the automated assistant can cause the smart lights to be reverted back to the "off" state (and optionally without changing the intensity of the smart lights). Moreover, in these examples, the automated assistant may generate a prompt to be provided for presentation to the user, and may determine whether the user intended the undo operation to be directed to turning the lights on and/or dimming the lights based on user input received responsive to the prompt. In contrast, if the additional spoken utterance had specified "Undo dimming", then the automated assistant can cause the smart lights to be reverted back to the previous intensity and keep the smart lights in the "on" state without generating any prompt. Further, if the additional spoken utterance had specified "Undo all of that" or the like, then the automated assistant can cause the smart lights to be reverted back to the "off" state (and optionally without changing the intensity of the smart lights) without generating any prompt. Also, in contrast, had the commands to "turn on" the kitchen lights and "dim" the kitchen lights been received in separate utterances, the automated assistant may undo the most recent state change.

In some implementations, and with prior permission from the user, the automated assistant can access operation logs that include data that characterizes recent operations that have been performed by applications associated with the user and/or actions that have been performed by the automated assistant on behalf of the applications (e.g., controlling one or more smart devices). The operation logs can be processed using a heuristic process and/or one or more trained machine learning models to identify a particular operation and/or cluster of operations that the user may be seeking to undo, and that are defined with various levels of granularity (e.g., undoing inclusion of a particular word or phrase vs. undoing inclusion of a sentence or paragraph in the document example). For example, the operation logs can be processed to identify one or more recent operations that are most correlated to the "undo" command issued by the user. In some versions of those implementations, the operation logs can be generated by the automated assistant based on data characterizing various interactions between the user and one or more applications and/or smart devices, as well as other contextual data that may be associated with those interactions. For example, the user may have provided the spoken utterance, "Undo," when the user was viewing the application in the foreground of a display interface of a computing device. This foreground position of the application can be characterized by contextual data, which can be used by the automated assistant to determine that the user is most likely requesting that only the most recent operations, of the application, in the operations logs should be undone. Based on this determination, the automated assistant can identify one or more most recent operations performed using the application and cause one or more other operations to be performed to undo those most recent operations. As another example, the user may have provided the spoken utterance, "Undo," within a threshold duration of time of one or more particular operations being performed. This temporal proximity of the one or more particular operations and the undo operation can be characterized by contextual data, which can be used by the automated assistant to determine that the user is most likely requesting that one or more of the particular operations should be undone. Based on this determination, the automated assistant can identify one or more of the particular operations and cause one or more other operations to be performed to undo those most recent operations. Moreover, the automated assistant can identify one or more most recent operations, in the operations performed using the application that are semantically related. For example, edits to paragraphs of a document or a section of a document in a document editing application may be determined to be semantically related, and the edits to those paragraphs or sections can be identified as a cluster of operations that the user may be seeking to undo.

In some implementations, the automated assistant can provide the user with one or more options for operations to be undone by the automated assistant. Alternatively, or additionally, the automated assistant can provide the user with one or more previous application states to select from for undoing certain operations. For example, in response to the spoken utterance, "undo", the automated assistant can cause two or more selectable graphical user interface (GUI) elements to be rendered at a display interface being accessed by the user. A first selectable GUI element can include content that reflects a first previous state of the application, and a second selectable GUI element can include content that reflects a different, second previous state of the application. For instance, the first selectable GUI element and the second selectable GUI elements can each include a different rendering of a draft document, which the user was editing via the document editing application, prior to one or more most recent edits that the user made to the draft document, a different state of a smart device, which was recently caused to be changed via the corresponding smart device application, a different date and/or time for a calendar entry or reminder, which was recently caused to be changed via the calendar application or reminders application, respectively. Should the user identify a particular state that to revert to, the user can select a particular selectable GUI element corresponding to that particular state. In response, the automated assistant can cause the document editing application to modify the draft document so that the draft document returns to a state corresponding to the selected GUI element.

In some implementations, the user can request that the automated assistant perform a particular type of undo, such that certain operations are selected to be undone and other operations are not undone. The operations can be selected by the automated assistant according to content of the input provided by the user and/or contextual data associated with the input. For example, the user can be editing a playlist of a music application by adding some songs to the playlist and removing other songs from the playlist. While the user is continuing to edit the playlist, the user can invoke their automated assistant by providing a spoken utterance such as, "Assistant, undo those additions." In response, the automated assistant can determine that some of the most recent operations performed by the user via the music application include adding, re-ordering, and/or removing songs from a playlist. The automated assistant can then select the most recent operations of adding songs, while bypassing selecting any operations related to removing songs. The automated assistant can then perform one or more operations that cause the music application to "undo" the previous operations that added songs to a playlist associated with the user. In these and other manners, the user can rely on the automated assistant to identify the specific operations that the user wants to have undone, without the user having to directly and manually interact with the music application to effectuate such changes.

The above description is provided as an overview of some implementations of the present disclosure. Further description of those implementations, and other implementations, are described in more detail below.

DETAILED DESCRIPTION

Figure 1A:
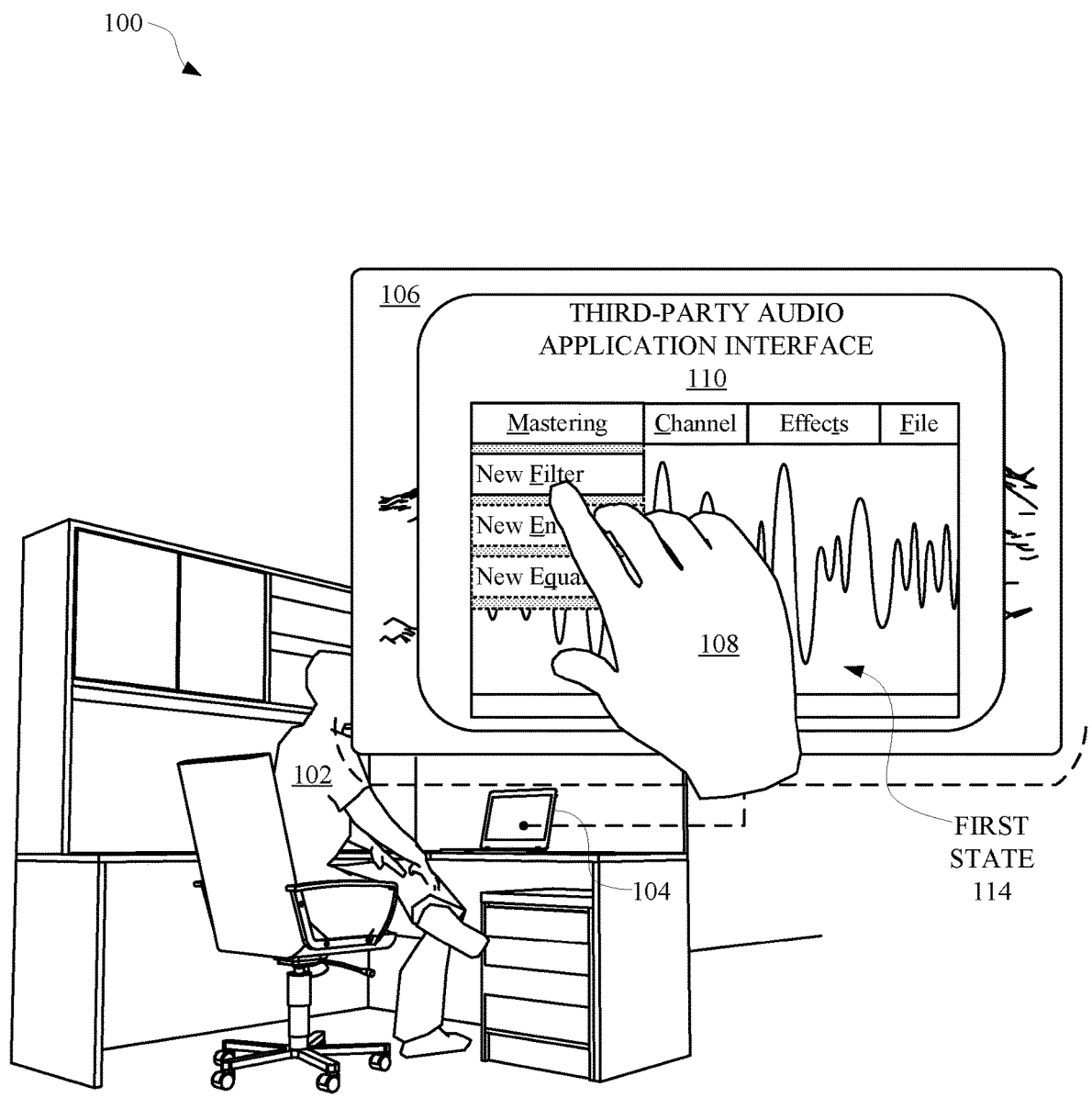
FIG. 1A, FIG. 1B, and FIG. 1C illustrate views of a user invoking an automated assistant to revert a separate application to a prior operating state.
Figure 1B:
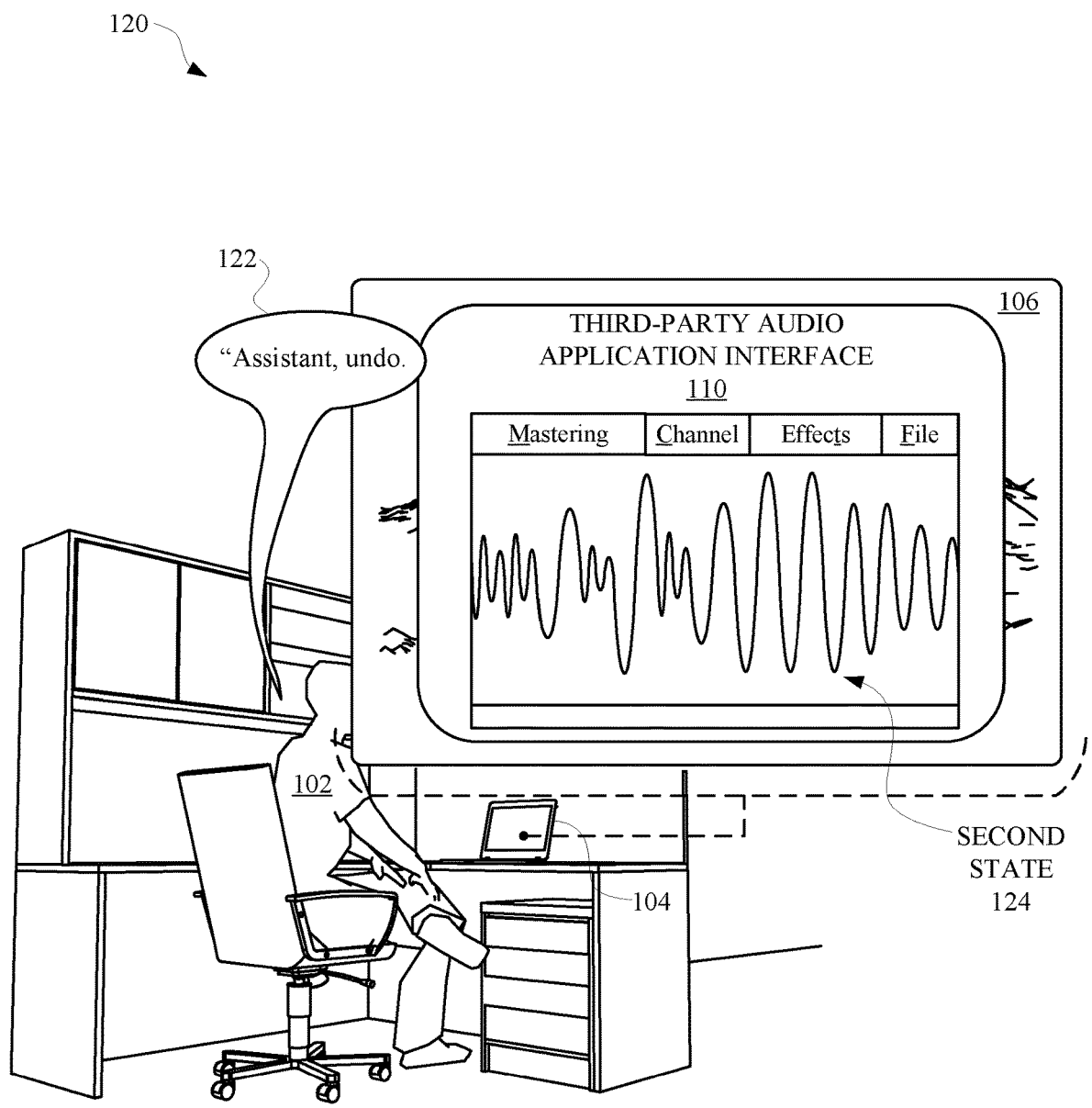
Figure 1C:
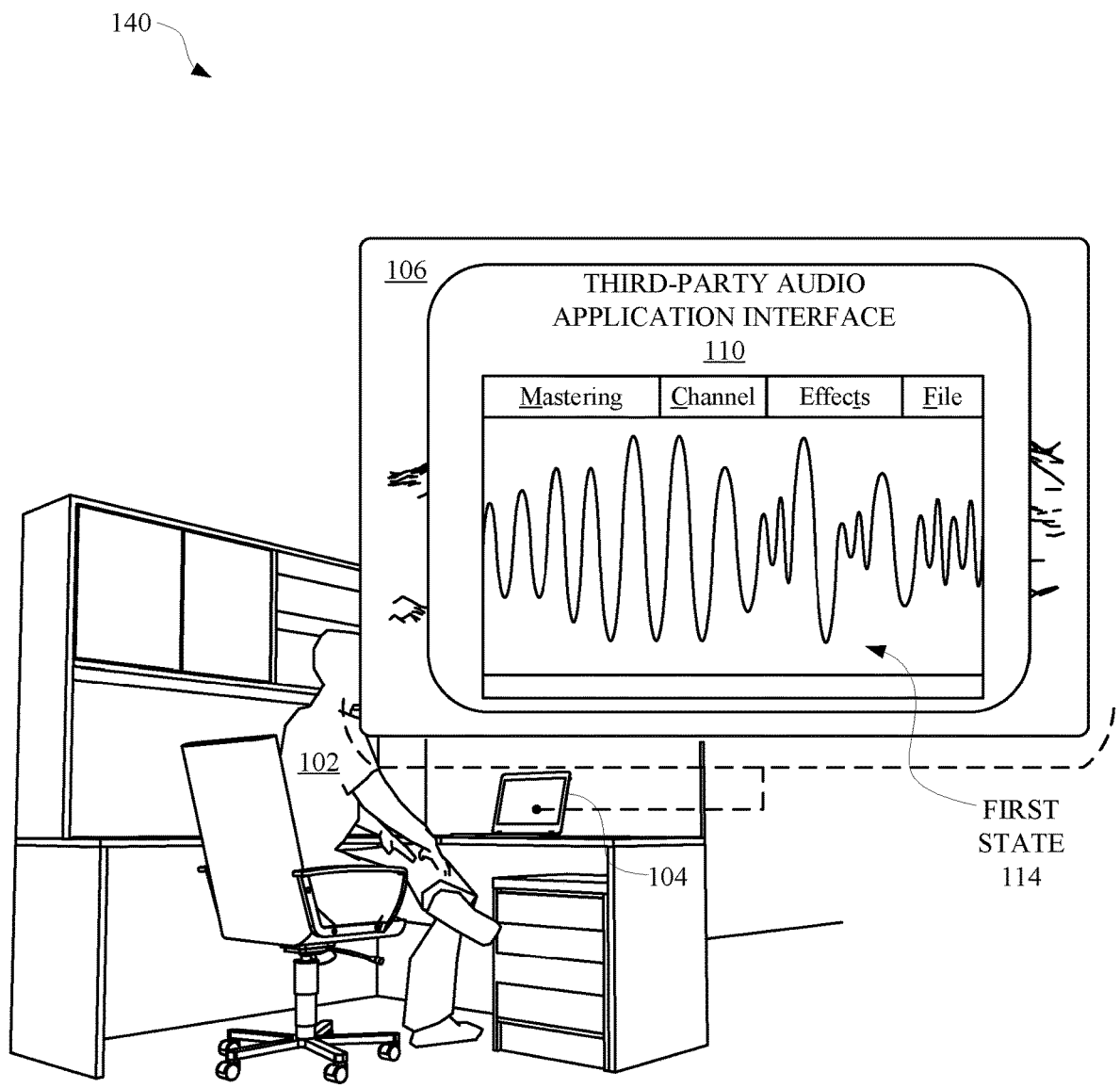

FIG. 1A, FIG. 1B, and FIG. 1C illustrate a view 100, a view 120, and a view 140, respectively, of a user 102 invoking an automated assistant to revert a corresponding application to a prior operating state. Allowing the user 102 to invoke the automated assistant to perform such operations can reduce a number of direct interactions that the user 102 would otherwise have with the corresponding application. As a result, certain tasks can be performed more quickly at a particular computing device 104, and certain computational resources, such as memory and processing bandwidth, can be preserved.

As an example, the user 102 can be interacting with a third-party application, such as a third-party audio application, that allows the user 102 to edit audio data. The third-party audio application can receive input from the user 102 via one or more interfaces of the computing device 104. For example, the computing device 104 can include a display interface 106 that can receive touch inputs from a hand 108 of the user 102. As used herein, the term first-party refers to an entity that publishes and maintains the automated assistant, whereas the term third-party refers to an entity that is distinct from the entity associated with the first-party and does not publish or maintain the automated assistant. Although the techniques are generally described herein with respect to third-party applications, it should be understood that is for the sake of example and is not meant to be limiting, and that the techniques described herein may also be utilized with respect to first-party applications.

While the user 102 is interacting with the third-party audio application, the third-party audio application can be in a first state 114. The third-party audio application can transition between the states in response to one or more inputs from the user 102 (e.g., spoken input, touch input, and/or typed input). For example, the user 102 can interact with a third-party audio application interface 110 in order to edit an audio file that the user 102 has opened. For instance, assume the user 102 applies a filter to reduce noise in the audio file and applies an equalizer to reduce an amplitude of certain frequencies in the audio file. When the user 102 has provided one or more of these inputs to the third-party audio application, the third-party audio application can exhibit a second state 124, as illustrated in view 120 of FIG. 1B. In other words, the inputs from the user 102 cause the audio file to be modified, thereby causing the third-party audio application to exhibit a different state.

In some implementations, the user 102 can invoke an automated assistant via the computing device 104 (or a separate computing device in communication with the computing device 104 over network(s) (e.g., a local area network (LAN), such as Wi-Fi, Bluetooth, etc. and/or a wide area network (WAN), such as the Internet)) in order to cause the third-party audio application to revert from the second state 124 back to the first state 114. The user 102 can cause the automated assistant to initialize performance of this "undo" operation by providing a spoken utterance 122 such as, "Assistant, undo." In response to receiving the spoken utterance 122, the automated assistant can identify one or more applications and/or one or more operations that the user 102 may be referring to. For example, in some implementations, the automated assistant can access log data that identifies operations performed by various applications associated with the user 102. In some implementations, operation identifiers in the log data can be processed to identify a cluster of operations that the user 102 may be referring to with respect to various applications. For example, similarities between operations can be identified to determine whether one or more of the operations should be "undone" in response to the spoken utterance 122.

For instance, characteristics such as receipt time of corresponding input, time of execution, location of a corresponding device, type of operation, application associated with operation, data associated with operation, a frequency the type of operation is performed (and optionally subsequently undone), an amount of time between the type of operation being performed and a subsequent operation (and optionally where the subsequent operation is an undo operation), metadata associated with a prior operation and/or content interacted with during the prior operation, features derived from text included in a document when one or more operations were performed (e.g., embeddings for one or more words or phrases, sentences, paragraphs, etc.), and/or any other characteristics of an operation can be identified by the automated assistant. Alternatively, or additionally, screen capture data can be generated, with prior permission from a user, to identify a state of one or more applications. One or more states can be stored in association with the log data in order that certain operations, selected from a set of operations, can be identified for reverting back to a particular application state. Notably, one or more of these characteristics can be specific to the user of the computing device 104, or generalized for a plurality of users.

In accordance with the example in FIGS. 1A-1C, in response to the spoken utterance 122, the automated assistant can identify one or more other operations that the third-party audio application can perform to return to the first state 114. For example, screen capture data and/or log data can indicate that the user 102 caused the third-party audio application to perform a filtering operation and an equalizing operation on the audio filter. In some implementations, this determination can be based on corresponding menu items (e.g., as illustrated in FIG. 1B) being selected by the user 102 and/or an operating system of the computing device 104 providing (with prior permission from the user) the automated assistant with various details about operations initialized by the user 102 who provided the spoken utterance 122.

FIG. 2A, FIG. 2B, FIG. 2C, FIG. 2D, and FIG. 2E illustrate a view 200, a view 220, a view 240, a view 260, and view 280, respectively, of a user 202 employing an automated assistant to revert a third-party application to a prior operating state. The third-party application can be, for example, a third-party calendar application that allows the user 202 to perform various scheduling tasks. The third-party calendar application can be installed at, or otherwise accessible via, a computing device 204 that also provides access to an automated assistant. In these and other manners, the user 202 can control the third-party calendar application via the automated assistant and a third-party calendar application interface 210.

For example, the user 202 can use their hand 212 for interacting with the third-party calendar application interface 210, via touch or typed input directed to a display interface 206, to schedule various events for different dates managed by the third-party calendar application. The user 202 can tap a particular day, such as a Monday, to add an event such as a band rehearsal. Additionally, the user 202 can tap on another day, such as a Tuesday, to add another event, as illustrated in view 200 of FIG. 2A. By interacting with the third-party calendar application interface 210, the user 202 can cause user inputs to be communicated from an operating system of the computing device 204 to the third-party calendar application. As a result, the user inputs can cause the third-party calendar application to perform one or more operations and/or change an operating state of the third-party calendar application. For example, in response to receiving one or more user inputs, such as selecting a drop-down menu to create a new event and inputting text to certain fields of the new event, the third-party calendar application interface 210 can render a new event 224.

In some implementations, the automated assistant can generate and/or access log data that characterizes one or more operations and/or one or more operating states of the third-party calendar application. For example, the log data can characterize the first application state in which the calendar rendered at the third-party calendar application interface 210 does not include any events. The log data can characterize a second application state in which the calendar rendered at the third-party calendar application interface 210 includes a single event for a Monday on the calendar. Further, the log data can characterize a third application state in which the third-party calendar application interface 210 is rendering the event for Monday and Tuesday, but the new event 224 for Tuesday is incomplete.

While the user is interacting with the third-party calendar application interface 210, the user 202 can invoke an automated assistant to revert the third-party calendar application to a prior state. For example, the user 202 can provide a spoken utterance 222 such as, "Assistant, undo." Although the user 202 does not specify a particular state for the third-party calendar application to revert to, the automated assistant can nonetheless either independently determine the operating state that the user 202 is seeking to have restored, or provide state options for the user 202 to select from. In some implementations, the computing device 204 and/or a separate computing device 244 can process input data 246 corresponding to the spoken utterance 222. The input data 246 can be processed to identify one or more requests submitted by the user 202 to the automated assistant. For example, the automated assistant can determine that the spoken utterance 222 corresponds to a request for the automated assistant to initialize an undo operation at one or more applications (e.g., the third-party calendar application or another application accessible at the computing device 204 or the separate computing device 244). In determining that the spoken utterance 222 corresponds to the request for the automated assistant to initialize the undo operation, the automated assistant can process, using automatic speech recognition (ASR) model(s), the spoken utterance 222 to generate recognized text. Further, the automated assistant can process, using natural language understanding (NLU) model(s), the recognized text to identify an intent indicative of the request for the automated assistant to initialize the undo operation. Processing the spoken utterance 222 to determine that it includes the request for the automated assistant to initialize the undo operation is described in detail herein (e.g., with respect to FIG. 3).

Based on this determination, the automated assistant can generate and/or identify state data 248 that characterizes one or more states of one or more applications and/or smart devices associated with one or more of the applications that may be associated with the user 202. For example, application data associated with one or more applications that have been accessed by the user 202 can be processed to identify application states that have recently been modified by the user 202. Additionally, or alternatively, contextual data that characterizes various contextual features associated with the spoken utterance 222 can be processed. In some implementations, the state data 248 can be generated through a heuristic process and/or using one or more trained machine learning models. For example, one or more trained machine learning models can be used when processing application data, log data, and/or contextual data to identify a correlation between the request from the user and one or more application states.

State selection data 250 can be generated based on one or more application states that have been identified as correlating to the request for an undo operation. The state selection data 250 can, for example, identify multiple states that the user 202 may be requesting the automated assistant to revert an application and/or smart device to. For example, the state selection data 250 can include graphical data (e.g., visual content, natural language content) corresponding to application interfaces for the third-party calendar application. The automated assistant can use the state selection data 250 to generate a prompt at an application interface of the computing device 204, to allow the user 202 to select a particular application state. In some implementations, the automated assistant can provide the state selection data to the third-party calendar application and/or an operating system of the computing device 204 to cause an interface of the computing device 204 to render state selection options for the user 202.

Figure 2A:
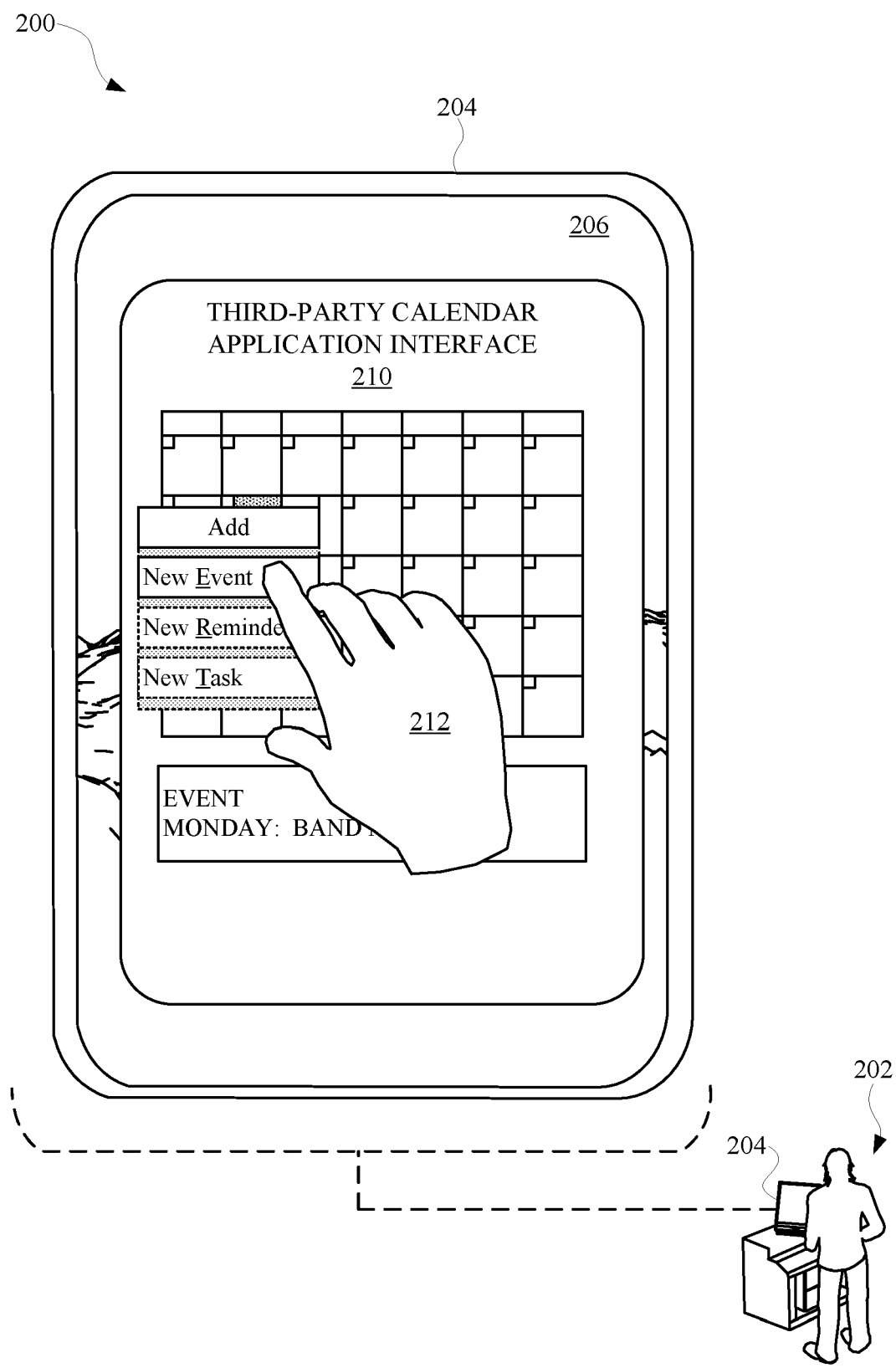
FIG. 2A, FIG. 2B, FIG. 2C, FIG. 2D, and FIG. 2E illustrate views of a user employing an automated assistant to revert a third-party application to a prior operating state.
Figure 2B:
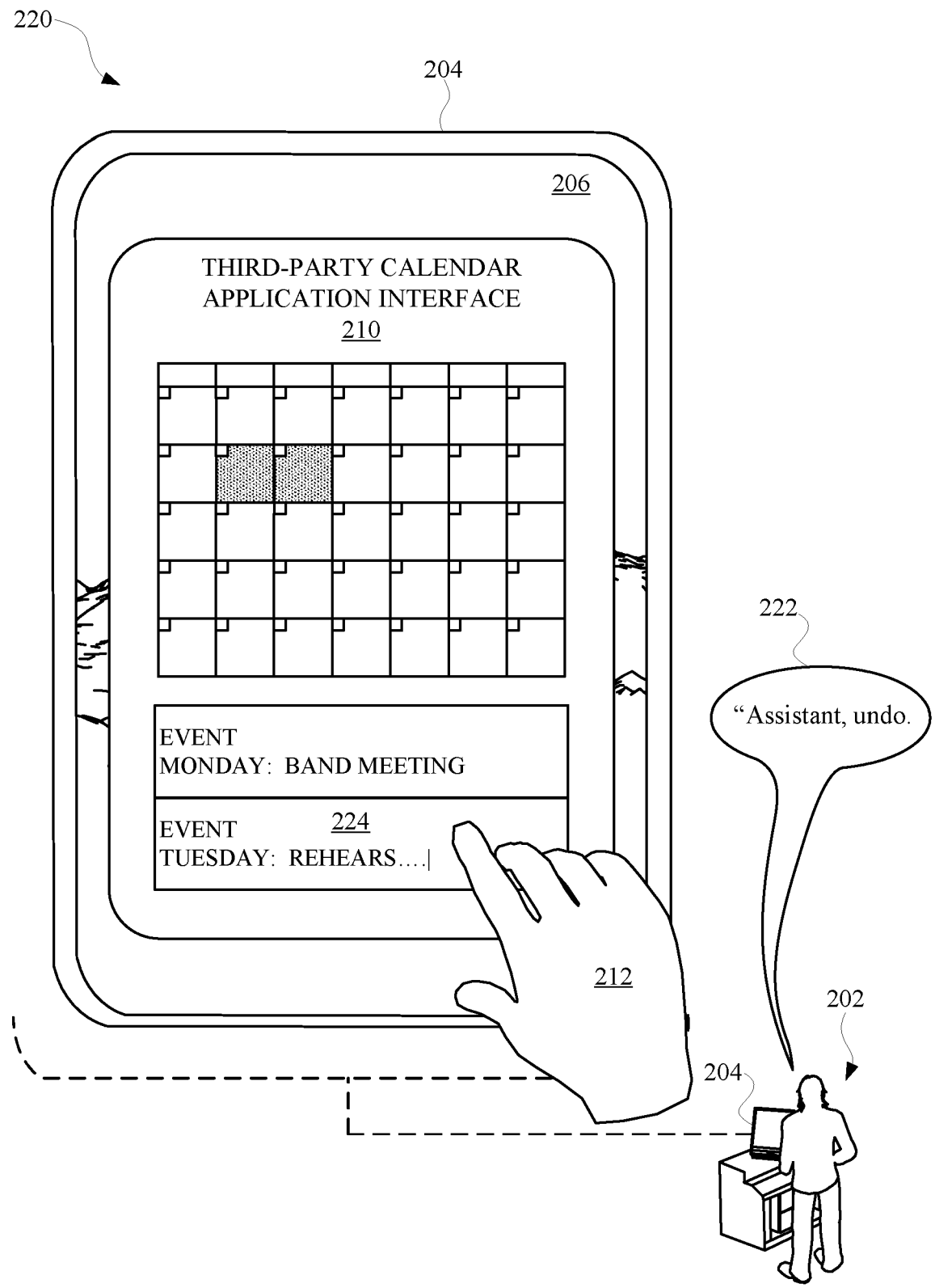
Figure 2C:
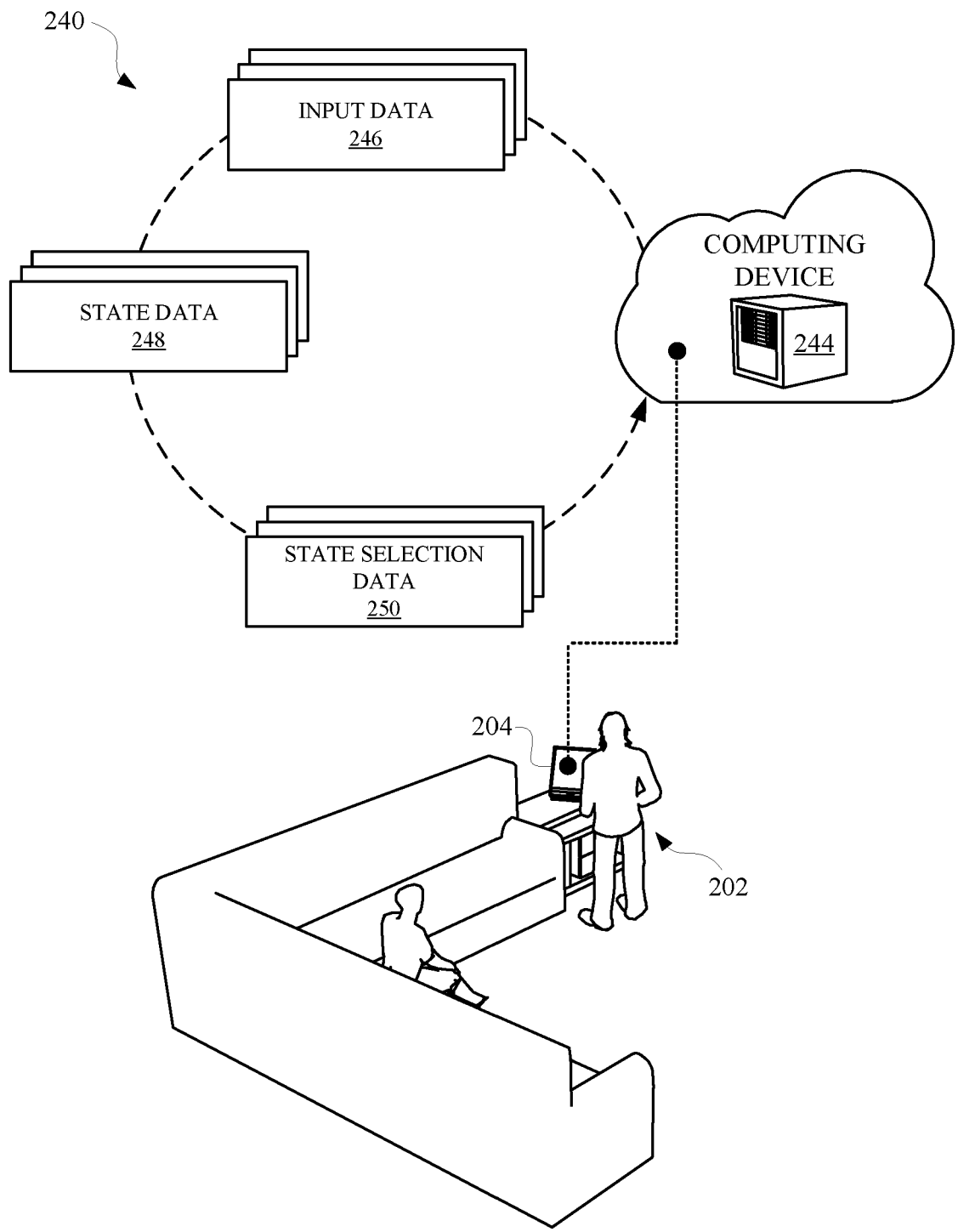
Figure 2D:
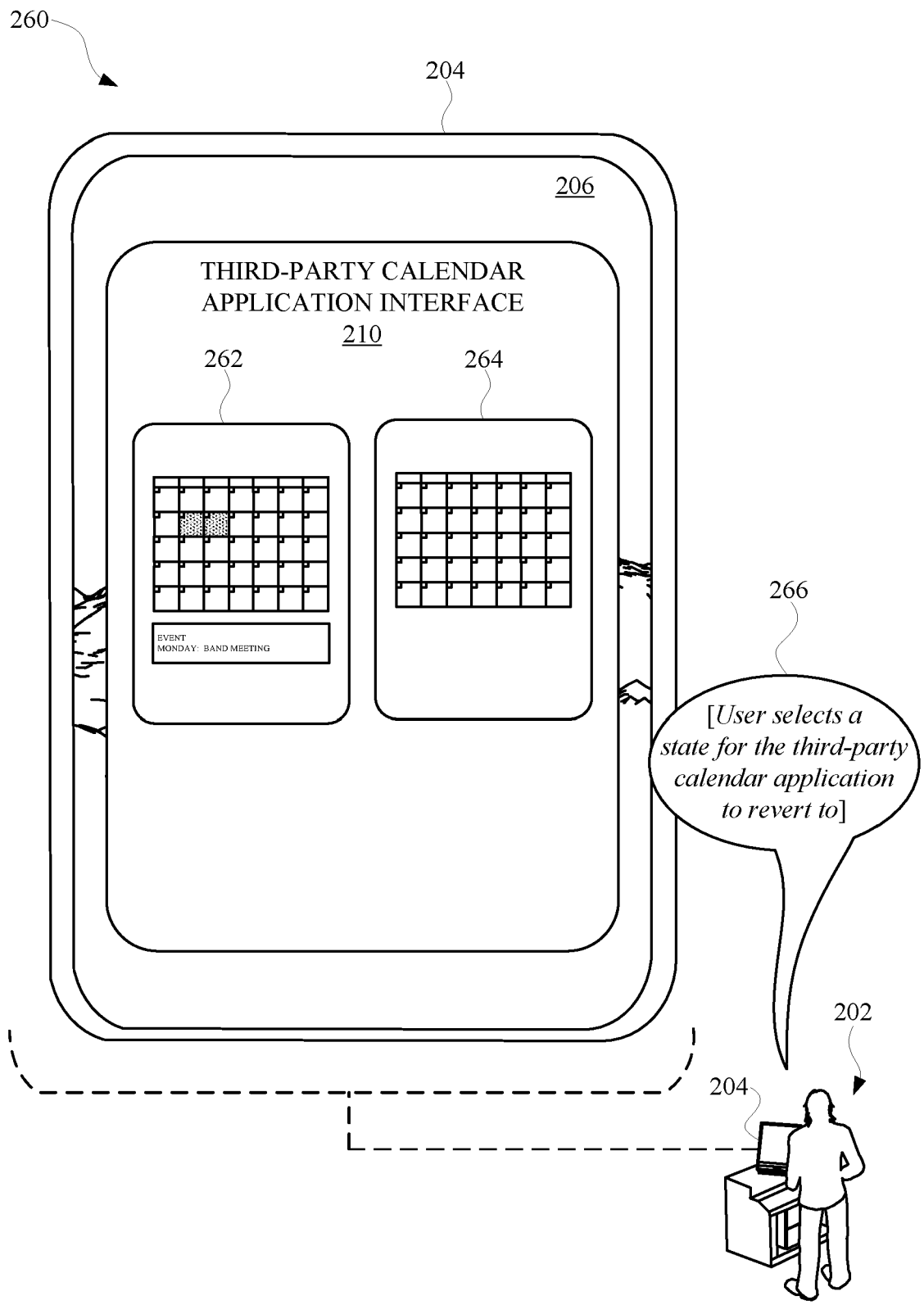
Figure 2E:
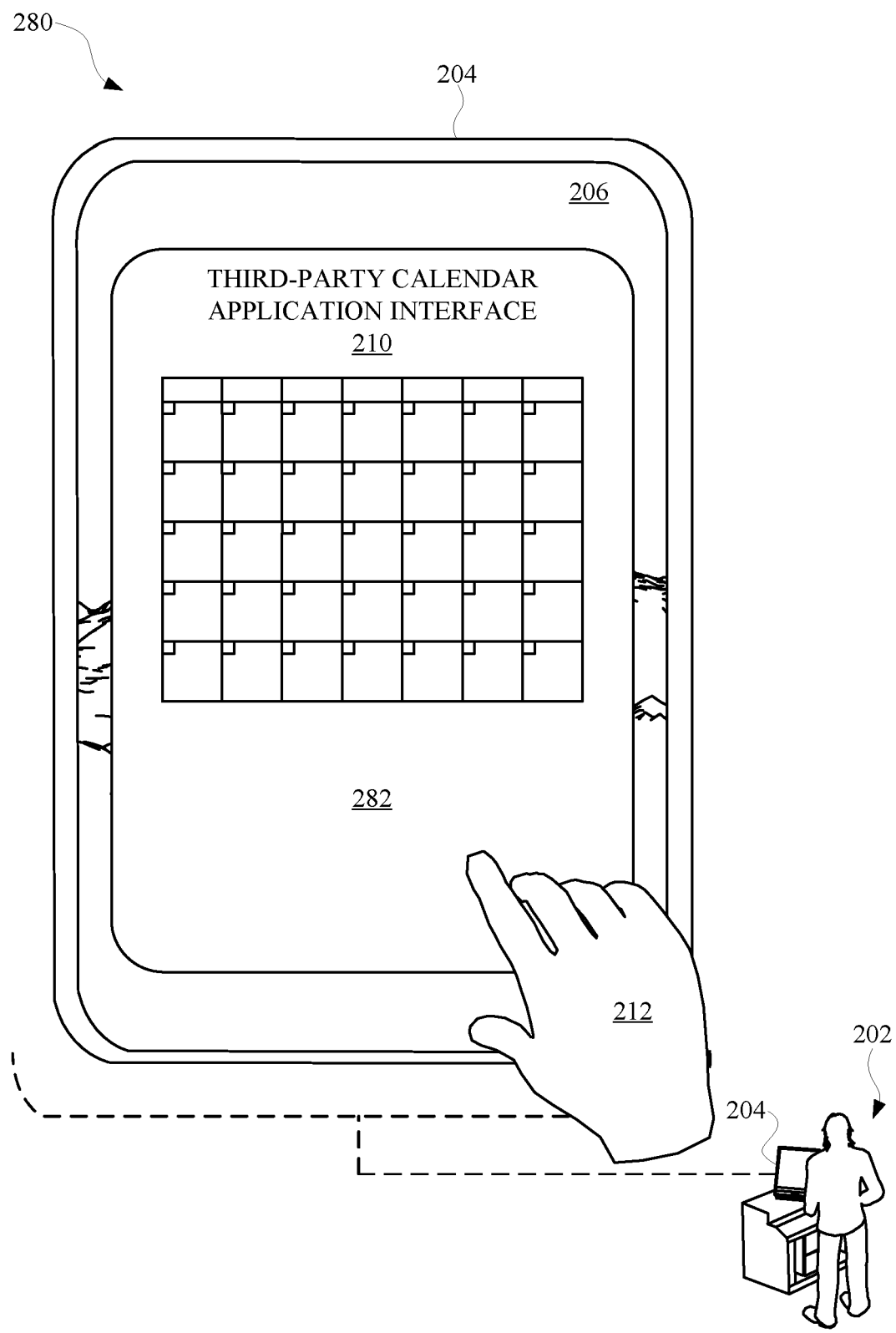

For example, and as provided in view 220 of FIG. 2D, the automated assistant can cause a first selectable element 262 and a second selectable element 264 to be rendered at a display interface 206 of the computing device 204. When the selectable elements are rendered at the display interface 206, the user 202 can perform an operation 266 by selecting a particular selectable element, from among at least the first selectable element 262 and the second selectable element 254, that corresponds to a desired application state that they would like the third-party calendar application to revert to. For example, the user 202 can use their hand 212 to tap the display interface 206 at a location corresponding to the second selectable element 264. In response, the automated assistant can cause the third-party calendar application to perform one or more operations to revert to an application state in which the Monday event and the Tuesday event (e.g., from FIG. 2B) are no longer input to the calendar. This application state can correspond to the image content of the second selectable element 264 provided in FIG. 2D, in which a portion 282 of the third-party calendar application interface 210 no longer shows the Monday event and Tuesday event. Furthermore, this can preserve computational resources and time that would otherwise be consumed if the user had to directly and sequentially input instructions to the third-party calendar application to remove the events.

In some implementations, the automated assistant can generate graphical content that characterizes various application interfaces of various applications, and the graphical content can be stored in association with operations identified in log data. In these and other manners, when a user requests the automated assistant to revert an application and/or smart device to a previous state, a user selection of a GUI selectable element can be correlated to one or more operations identified in the log data. The automated assistant can then identify one or more other operations for the application to perform to undo the one or more operations and/or revert the application and/or smart device to the prior state. In some implementations, upon identifying one or more operations that caused a current state, which the user is requesting the automated assistant to revert an application and/or smart device from, the automated assistant can request operation data via an application programming interface. The operation data can identify one or more other operations that will undo the one or more operations. Using this operation data, the automated assistant can then request that the application and/or the smart device perform the one or more other operations.

Figure 3:
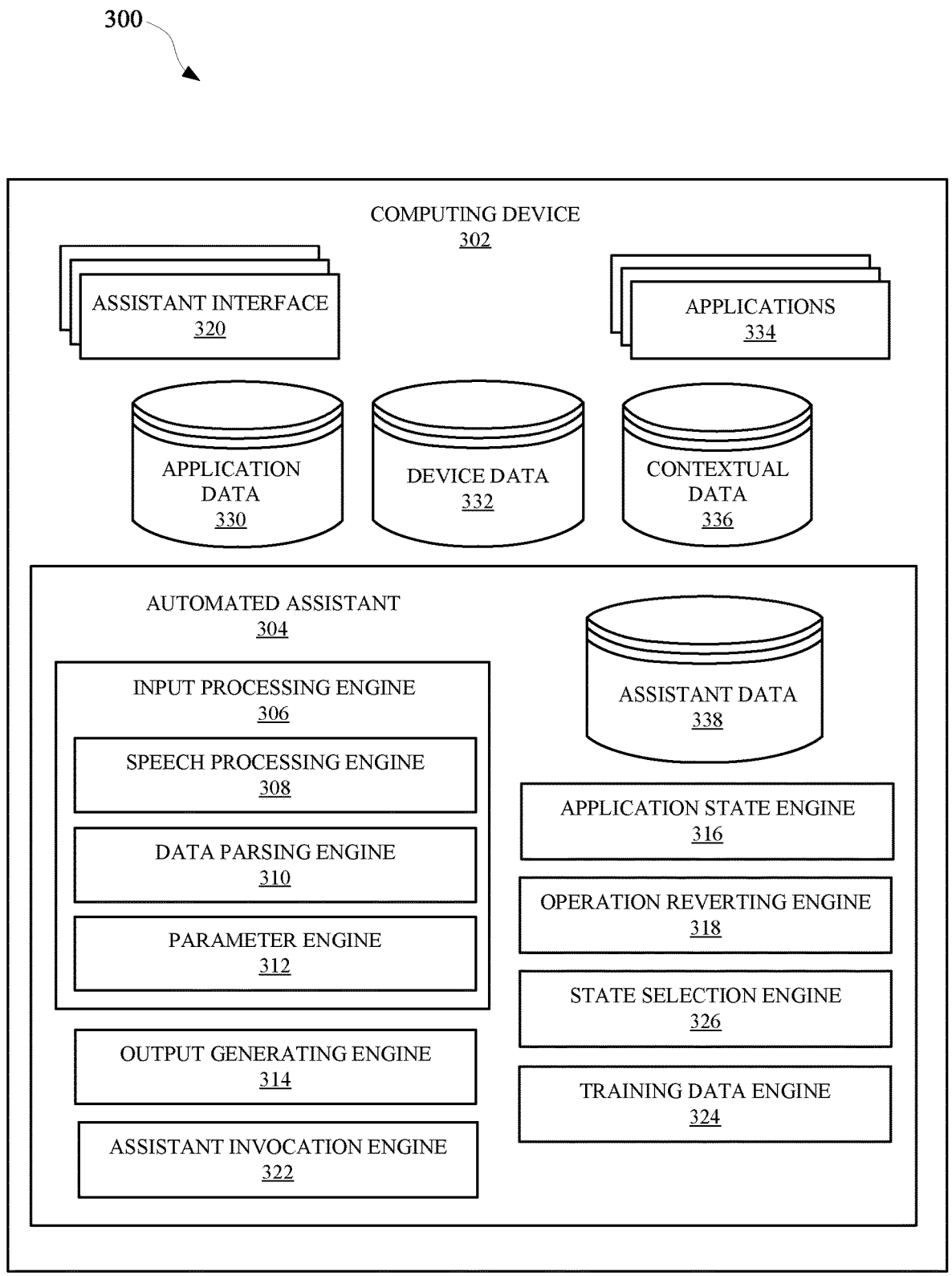
FIG. 3 illustrates a system that provides an automated assistant that can perform operations to revert various applications to prior states that the applications may have arrived at via previous user inputs.

FIG. 3 illustrates a system 300 that provides an automated assistant that can perform operations to revert various applications to prior states that the applications and/or the smart devices may have arrived at via previous user inputs. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application and/or a smart device. For instance, a user can initialize the automated assistant 304 by providing a verbal, textual, and/or a touch input to an assistant interface 320 to cause the automated assistant 304 to initialize one or more actions (e.g., provide data, control a peripheral device, access an agent, generate an input and/or an output, etc.). Alternatively, the automated assistant 304 can be initialized based on processing of contextual data 336 using one or more trained machine learning models. The contextual data 336 can characterize one or more features of an environment in which the automated assistant 304 is accessible, and/or one or more features of a user that is predicted to interact with the automated assistant 304. The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other computing devices can be in communication with a server device over a network, such as the Internet. Additionally, the computing device 302 and any other computing devices can be in communication with each other over a local area network (LAN), such as a Wi-Fi network. The computing device 302 can offload computational tasks to the server device to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations, where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system). Accordingly, the operations described herein can be performed locally at the computing device 302 (or locally at another computing device in communication with the computing device 302 over the network(s)), remotely at server(s)), and/or any combination thereof.

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data using the ASR model(s). The audio data can be transmitted from, for example, the computing device 302 to the server device to preserve computational resources at the computing device 302, and the audio data can be processed remotely at the server using the ASR model(s). Additionally, or alternatively, the audio data can be exclusively processed locally at the computing device 302 using the ASR model(s).

The process utilized by the ASR model(s) for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 and/or smart devices associated therewith for providing an output to one or more of the applications 334 and/or the smart devices associated therewith.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302 (e.g., the ASR model(s)). The on-device speech recognition generates recognized text for a spoken utterance (if any) present in the audio data. Also, for example, on-device NLU can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to IoT device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334, which can be provided by a third-party entity that is different from an entity that provided the computing device 302 and/or the automated assistant 304. An application state engine of the automated assistant 304 and/or the computing device 302 can access application data 330 to determine one or more actions capable of being performed by one or more applications 334, as well as a state of each application of the one or more applications 334 and/or a state of a respective smart device that is associated with the computing device 302. A device state engine of the automated assistant 304 and/or the computing device 302 can access device data 332 to determine one or more actions capable of being performed by the computing device 302 and/or one or more devices that are associated with the computing device 302. Furthermore, the application data 330 and/or any other data (e.g., device data 332) can be accessed by the automated assistant 304 to generate contextual data 336, which can characterize a context in which a particular application 334 and/or device is executing, and/or a context in which a particular user is accessing the computing device 302, accessing an application 334, and/or any other device or module.

While one or more applications 334 are executing at the computing device 302, the device data 332 can characterize a current operating state of each application 334 executing at the computing device 302. Furthermore, the application data 330 can characterize one or more features of an executing application 334, such as content of one or more graphical user interfaces being rendered at the direction of one or more applications 334. Additionally, or alternatively, the application data 330 can characterize an action schema, which can be updated by a respective application and/or by the automated assistant 304, based on a current operating status of the respective application. Additionally, or alternatively, one or more action schemas for one or more applications 334 can remain static, but can be accessed by the application state engine to determine a suitable action to initialize via the automated assistant 304.

The computing device 302 can further include an assistant invocation engine 322 that can use one or more trained machine learning models to process application data 330, device data 332, contextual data 336, and/or any other data that is accessible to the computing device 302. The assistant invocation engine 322 can process this data to determine whether or not to wait for a user to explicitly speak an invocation phrase to invoke the automated assistant 304, or consider the data to be indicative of an intent by the user to invoke the automated assistant—in lieu of requiring the user to explicitly speak the invocation phrase and/or provide an express input for initially invoking the automated assistant. For example, the one or more trained machine learning models can be trained using instances of training data that are based on scenarios in which the user is in an environment where multiple devices and/or applications are exhibiting various operating states. The instances of training data can be generated to capture training data that characterizes contexts in which the user invokes the automated assistant and other contexts in which the user does not invoke the automated assistant.

When the one or more trained machine learning models are trained according to these instances of training data, the assistant invocation engine 322 can cause the automated assistant 304 to detect, or limit detecting, spoken invocation phrases from a user based on features of a context and/or an environment. Additionally, or alternatively, the assistant invocation engine 322 can cause the automated assistant 304 to detect, or limit detecting for one or more assistant commands from a user based on features of a context and/or an environment. In some implementations, the assistant invocation engine 322 can be disabled or limited based on the computing device 302 detecting an assistant suppressing output from another computing device. In these and other manners, when the computing device 302 is detecting an assistant suppressing output, the automated assistant 304 will not be invoked based on contextual data 336—which would otherwise cause the automated assistant 304 to be invoked if the assistant suppressing output was not being detected.

In some implementations, the computing device 302 can include an application state engine 316 that can provide the automated assistant 304 with data characterizing current states of one or more applications 334 and/or prior states of one or more applications 334. For example, the application state engine 316 can access GUI data that characterizes application interfaces that may be rendered at an interface of the computing device 302. Based on the GUI data, the application state engine 316 can generate state data that characterizes a respective state of each application. In some implementations, the application state engine 316 can access log data, which can be provided, with prior permission from a user, by an operating system of the computing device 302. The application state engine 316 can use the log data to generate state data for each respective application. For example, the application state engine 316 can process the log data using a heuristic method and/or one or more trained machine learning models in order to identify a cluster of operations that may correspond to a particular state of an application 334. For example, the application state engine 316 can use one or more of these techniques to identify one or more operations that are semantically related. For instance, edits to a first section of a document in a document editing application may be semantically related to one another, edits to a second section of a document in the document editing application may be semantically related to one another, but not to the edits in the first section of the document. In these and other manners, the automated assistant 304 can readily identify the particular state in response to a request from the user to revert the application 334 to the particular state.

In some implementations, the computing device 302 can include an operation reverting engine 318, which can process data generated by the application state engine 316 in order to identify operations for reverting one or more applications 334 and/or a smart device associated with one or more of the applications 334 to one or more respective previous states. For example, when the application state engine 316 generates state data that identifies a particular state of an application 334 and/or a smart device based on a set of operations identified in log data, the operation reverting engine 318 can access identifiers for the set of operations. Based on these identifiers, the operation reverting engine 318 can use an API and/or other application interface in order to identify one or more other operations for undoing the set of operations. In these and other manners, when the particular state of the application 334 and/or the smart device associated with the application 334 is requested to be a state that the user would like to "undo," automated assistant 304 can identify the one or more other operations. The automated assistant 304 can then cause the application 334 and/or the smart device associated with the application 334 to perform the one or more operations in order to cause the application 334 and/or the smart device associated with the application 334 to revert from the particular state to a prior state (e.g., a state previously exhibited by the application 334 prior to the set of operations being executed).

In some implementations, the computing device 302 can include a state selection engine 326 that can prompt a user to select a particular state to revert an application and/or smart device to. For example, when the automated assistant 304 determines that there are multiple candidate states for the user to select from, the state selection engine 326 can generate data that can be rendered at a user interface of the computing device 302 and/or another computing device. The user can then select a particular candidate state at the user interface in order to cause the automated assistant 304 to communicate one or more requests to the application 334 and/or the smart device associated with the application 334 to cause the application 334 and/or the smart device associated with the application 334 to revert to the particular candidate state. In some implementations, the state selection engine 326 can generate graphical data that can characterize graphical features of each respective interface of each candidate application state. In these and other manners, when the automated assistant 304 identifies multiple candidate states the user may be referring to, the user can be on notice that a selection of one of the candidate states will cause the application 334 and/or the smart device associated with the application 334 to revert to the particular state depicted in the graphical user interface of the computing device 302.

In some implementations, the automated assistant 304 can optionally include a training data engine 324 for generating training data, with prior permission from the user, based on interactions between the automated assistant 304 and the user, and/or the user and one or more other applications. The training data can characterize instances in which the automated assistant 304 may have initialized without being explicitly invoked via a spoken invocation phrase, and thereafter the user either provided an assistant command and/or did not provide an assistant command within a threshold period of time. In some implementations, the training data can be shared, with prior permission from the user, with a remote server device that also receives data from a variety of different computing devices associated with other users. In these and other manners, one or more trained machine learning models can be further trained in order that each respective automated assistant can employ a further trained machine learning model to better assist the user, while also preserving computational resources. In some implementations, the training data engine 324 can generate training data based on feedback received from a user when the user selects, or does not select, a particular state for another application to revert back to. In these and other manners, the automated assistant 304 can provide more relevant selectable options in response to a request from a user to revert an application from a current state.

Figure 4:
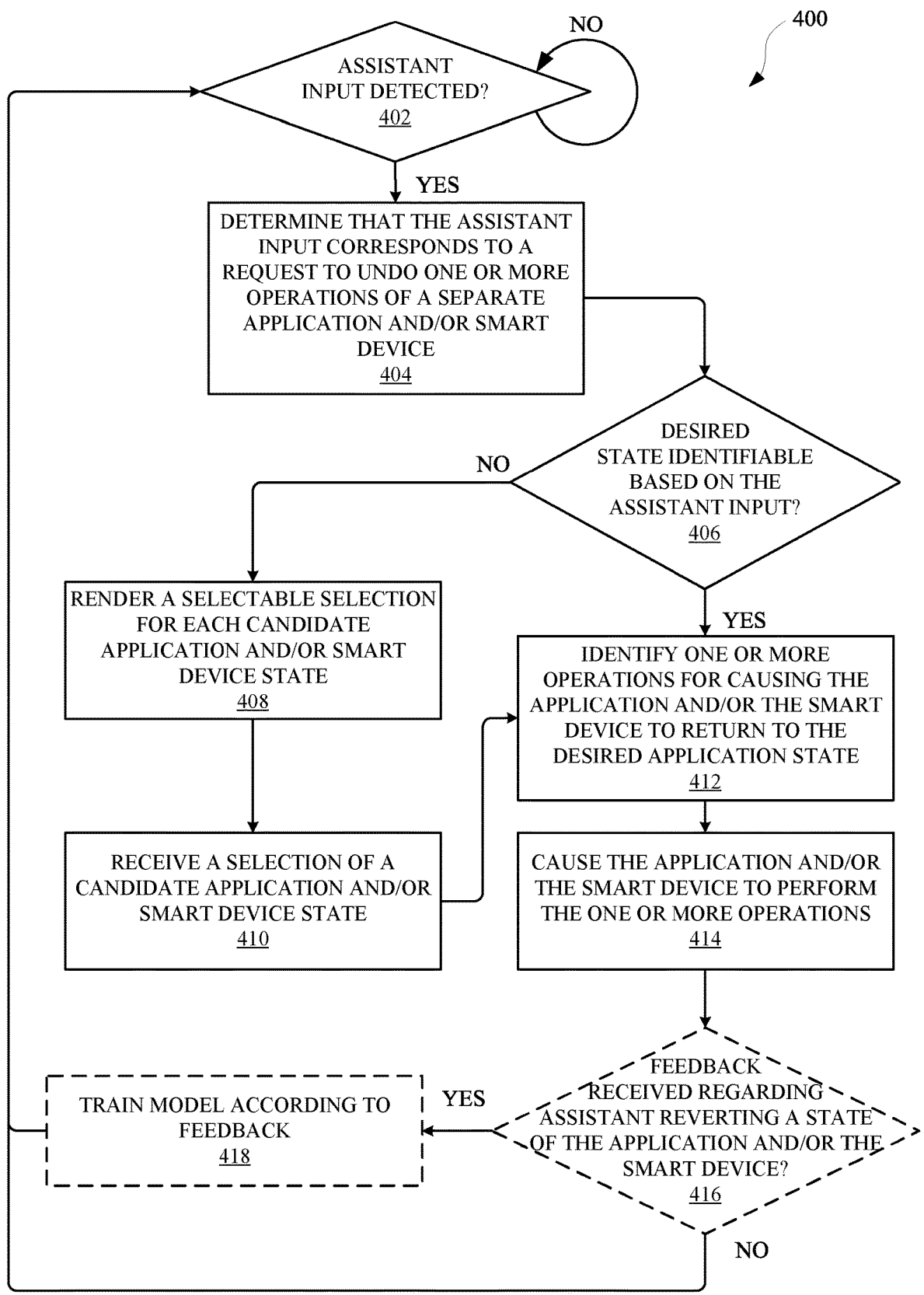
FIG. 4 illustrates a method for causing an automated assistant to revert each application of one or more separate applications to a respective application state.

FIG. 4 illustrates a method 400 for causing an automated assistant to revert each application of one or more separate applications to a respective application state. The method 400 can be performed by one or more applications, computing devices, and/or any other apparatus or module capable of interacting with an automated assistant. The method 400 can include an operation 402 of determining whether an assistant input has been detected. The assistant input can be, for example, a spoken utterance such as, "undo," which can be provided by a user to an audio interface of a computing device. In response, the automated assistant can determine, based on the contextual data, that the spoken utterance is directed to the automated assistant, despite the user not explicitly identifying the automated assistant.

When an assistant input is detected, the method 400 can proceed from the operation 402 to an operation 404. Otherwise, the automated assistant can continue to determine whether a user has provided an input to the automated assistant. The operation 404 can include determining that the assistant input corresponds to a request for the automated assistant to undo one or more operations of a separate application and/or a smart device. In some implementations, the user can provide a request for the automated system to revert an application file to a prior version. For example, assume the user provides a spoken utterance of "Assistant, revert to the more polite version," which can refer to a document that the user is editing with a messaging application. The spoken utterance can refer to a version of the document that existed prior to one or more edits made by the user. In some implementations, the automated assistant and/or the messaging application can provide an indication of a tone of content as feedback, and the automated assistant can use this feedback to identify prior application states (i.e., operating states) that the user may be referring to. In these implementations, the automated assistant can generate a representation of the content (e.g., an embedding or tag-based representation for image-based content, an embedding or word2vec representation for text-based content), and can compare the representation to a corresponding representation of the spoken utterance. For example, if the spoken utterance includes "more polite" or some other semantic indication of the content to be reverted to, the automated assistant can compare an embedding of the spoken utterance to an embedding of these representations in a latent space. In some implementations, the user can provide a request for the automated system to revert a smart device to a prior state or sub-state. For example, assume the user provides a spoken utterance such as, "Assistant, undo," which is received subsequent to a prior spoken utterance of "Assistant turn on the kitchen lights and dim to 50%". In this example, "undo" may refer to turning the kitchen lights to the "on" state and/or dimming the kitchen lights to "50%".

When the automated assistant has determined that the user is requesting one or more operations of a separate application be undone, the method 400 can proceed from the operation 404 to an operation 406. The operation 406 can include determining whether a state of the application and/or the smart device desired by the user is identifiable based on the assistant input and/or other data. For example, in response to the aforementioned spoken utterance with respect to the document, the automated assistant may be able to identify a particular application state of a particular application that the user is referring to. As a result, the method 400 can proceed from the operation 406 to an operation 412. Otherwise, the method 400 can proceed from the operation 406 to an operation 408, such as when "undo" may refer to turning the kitchen lights to the "on" state and/or dimming the kitchen lights to "50%" in the latter example.

The operation 408 can include rendering one or more selectable selections corresponding to one or more respective candidate application states and/or smart device states (e.g., "on" or "off") or sub-states (e.g., "dimmed" or "not dimmed"). For example, the automated assistant can identify one or more candidate application states that the user may desire the application to revert to. Based on these candidate application states and/or smart device states, the automated assistant can cause an interface of a computing device to prompt the user to select one of the candidate application states and/or smart device states. For example, the automated assistant can audibly describe each of the candidate application states and/or graphically render content corresponding to each of the candidate application states and/or smart device states. In accordance with the aforementioned example, the automated assistant can graphically or audibly render a prompt that describes one or more features of one candidate application state that are not included in another candidate application state. For instance, the automated assistant can recite and/or describe a sentence from a document in a first application state, and then recite and/or describe a different sentence from the document in a second application state. In these and other manners, the user will be able to identify a particular state without having to spend an extensive amount of time reviewing all details of each state.

In some implementations, each candidate application state and/or smart device state can be identified from embeddings mapped in latent space. For example, as the user interacts with one or more applications, the automated assistant can generate embeddings corresponding to application states of an application and/or smart device states of a smart device. Thereafter, a request from a user to revert the application to a prior application and/or smart device state can cause the automated assistant to process the request and identify one or more candidate application states and/or smart device states from the embeddings. When the request corresponds to a particular embedding, the application state and/or smart device state associated with that particular embedding can be restored at the application and/or smart device. Alternatively, the automated assistant may determine that the request is associated with multiple different embeddings, for example, based on multiple embeddings satisfying a threshold for being associated with the request. Based on this determination, the automated assistant can cause candidate application states for the multiple embeddings to be selectable to the user via an interface of a computing device. The user can then select a candidate application state and/or smart device state in order to cause the automated assistant to revert the application to the selected application state and/or smart device state. The method 400 can proceed from the operation 408 to an operation 410 of receiving a selection of a candidate application state and/or smart device state. When the selection is received, the method 400 can proceed from the operation 410 to the operation 412.

The operation 412 can include identifying one or more operations for the application and/or the smart device to perform to return to the desired application state. In some implementations, the automated assistant can identify the one or more operations using the log data and an application programming interface. For example, operations identified in the log data that correspond to the selected application state and/or smart device state can be identified in one or more parameters of a call to an application programming interface (API). Data returned via the API can indicate one or more other operations for the application to perform to return the application to the desired application state. Alternatively, or additionally, the automated assistant can identify the one or more other operations for the application to perform to return to the desired application state and/or smart device state using data generated based on interactions between the user, the application, and/or an operating system of one or more computing devices. For example, the operating system can identify one or more inputs corresponding to the log data that identifies the operations to be undone to return to the desired application state and/or smart device state. Based on these inputs, the automated assistant can generate operation data that characterizes one or more other operations for the application to perform to return to the desired application state and/or for the smart device to perform to return to the desired smart device state. When the operations have been identified at the operation 412, the method 400 can proceed from the operation 412 to an operation 414, which can include causing the application and/or the smart device to perform the one or more operations.

In some implementations, the method 400 can include an optional operation 416 of determining whether any feedback was received regarding the assistant reverting the state of the application and/or the smart device. For example, feedback can be identified as a user selecting a particular candidate application state over one or more other candidate application states. The feedback can indicate to the automated assistant that certain factors for identifying candidate application state should be weighted differently for a particular application and/or type of request. For instance, a particular user may be more inclined to select a prior state when the prior state was the result of the user interacting with the application and/or smart device in a different location from where they provided the request. Therefore, application states and/or smart device states associated with a different geolocation of the user can be weighted and/or prioritized more than application states and/or smart device states associated with the same geolocation where the user provided the request. Alternatively, or additionally, a particular user may be more inclined to select a prior state that was the second-to-last state of the application and/or the smart device. For example, when the user is viewing an application file in the morning, they may realize that the edits they made late the night before were not ideal. Therefore, the user may provide a request (e.g., "Assistant, undo.") to cause the automated assistant to revert the application file to a prior state, and the automated assistant may prioritize a state exhibited by the application file before the previous night. For example, based on one or more instances of prior feedback, the automated assistant can omit the application state from the night before as a candidate application state that the user can select, and, instead, provide one or more other candidate application states for the user to select (e.g., one or more candidate application states that existed prior to the night before).

When feedback is received regarding the assistant reverting the state of the application, the method 400 can proceed from the optional operation 416 to an optional operation 418. Otherwise, the method 400 can return to the operation 402. The operation 418 can include training one or more trained machine learning models according to the feedback. In these and other manners, as the user, and/or other users, continue to invoke the automated assistant for undoing operations of separate applications, the automated assistant can adapt to preferences of users when undoing certain operations. For example, if the user provides a spoken utterance that includes an undo command subsequent to a spoken utterance of "turn on the kitchen lights and dim them to 50%", and the automated assistant turns the kitchen lights off, but the user goes back to manually turn the kitchen lights on (e.g., physically via a light switch or manually via the application associated with the smart lights), the automated assistant can infer that the user intended to keep the kitchen lights in the "on" state and that the undo references the "dimming". Accordingly, if the automated assistant encounters this sequence again, the automated assistant may only un-dim the kitchen lights. Further, the automated assistant can generalize this feedback to operations beyond this particular scenario. For example, assume the user provided an additional spoken utterance of "turn the kitchen lights red" prior to providing the undo command. In this example, the automated assistant may keep the lights dimmed, but revert the color of the kitchen lights to a color associated with a previous state.

Figure 5:
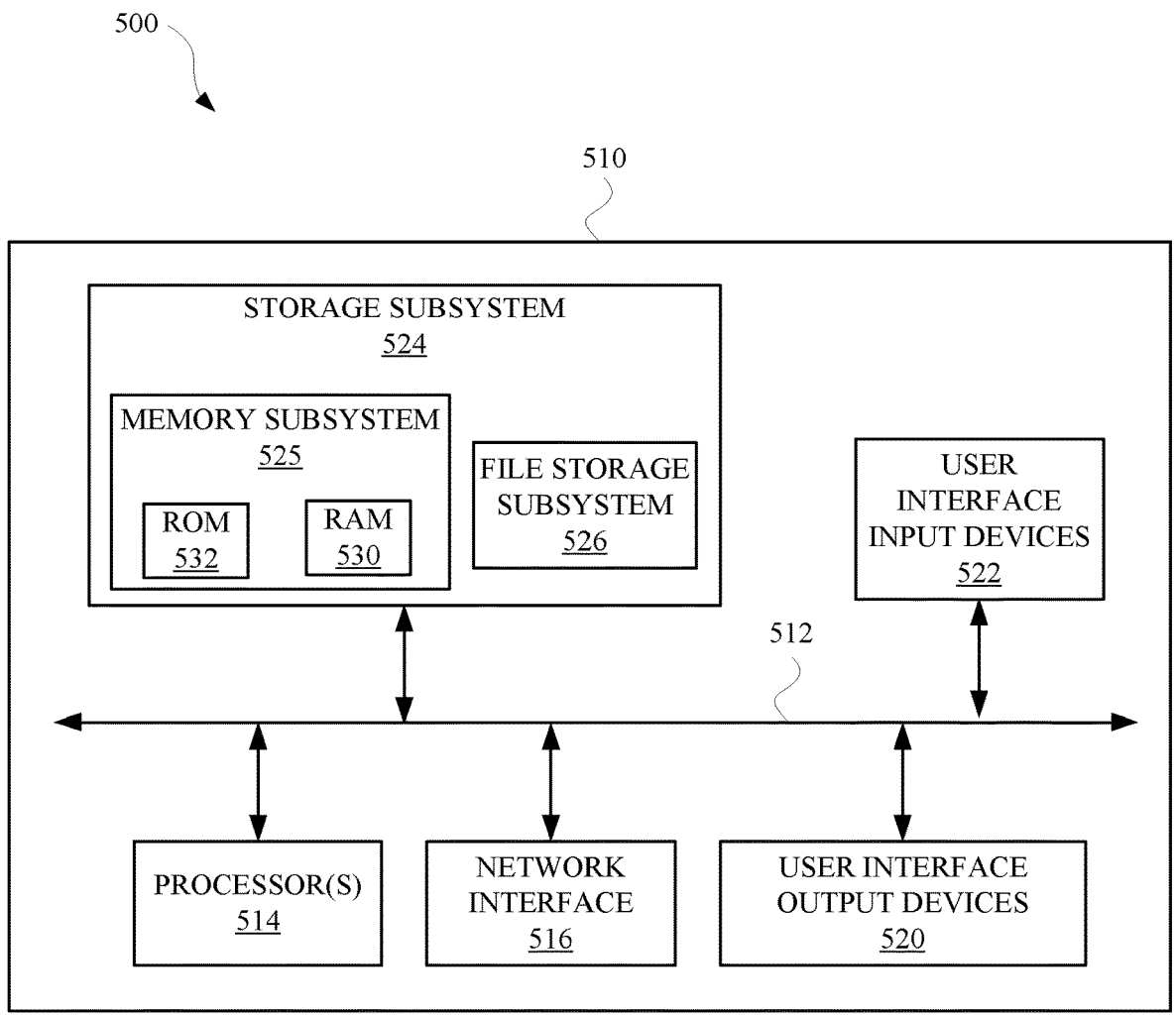
FIG. 5 is a block diagram of an example computer system.\

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of the system 300, computing device 104, computing device 204, computing device 244 automated assistant, and/or any other application, device, apparatus, and/or module discussed herein.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided, and includes receiving, by a computing device, an assistant input that is provided by a user to an automated assistant that is accessible via the computing device; determining, by the automated assistant, that the assistant input corresponds to a request to undo certain operations performed by an application that is separate from the automated assistant; and identifying, based on the assistant input, one or more operations that have affected a state of the application and are associated with the assistant input. The one or more operations caused the application to transition from a first application state to a second application state, and the user provided the assistant input during, or subsequent to, the application exhibiting the second application state. The method further includes causing, based on the assistant input, the application to revert to the first application state.

These and other implementations of technology disclosed herein can optionally include one or more of the following features.

In some implementations, the method may further include identifying, based on the assistant input, one or more other operations. The one or more other operations may have caused the application to transition from the second application state to a third application state. The method may further include causing a selection prompt to be rendered for the user, the selection prompt may include a first selectable option that identifies the first application state and a second selectable option that identifies the second application state, and the user may select the first selectable option in response to the selection prompt being rendered for the user. In some versions of those implementations, causing the selection prompt to be rendered may include generating a selectable graphical user interface (GUI) element that corresponds to the first selectable option and characterizes visual content of the first application state of the application, and generating another selectable GUI element that corresponds to the second selectable option and characterizes other visual content of the second application state of the application.

In some implementations, identifying the one or more operations that have affected the state of the application and are associated with the assistant input may include selecting the one or more operations from a set of operations that were initialized at the application within a period of time before the user provided the assistant input. The one or more operations may omit one or more other operations that were also initialized at the application within the period of time.

In some implementations, the method may further include, prior to receiving the assistant input, determining, by the automated assistant, that the application has performed the one or more operations that caused the application to transition from the first application state to the second application state. In some versions of those implementations, determining that the application has performed the one or more operations may include processing, using one or more trained machine learning models, image data that characterizes a GUI interface of the application when the application is exhibiting the second application state.

In some implementations, determining that the assistant input corresponds to the request to undo the certain operations performed by the application may include determining that the assistant input is associated with natural language content being rendered at an interface of the application when the user provided the assistant input. In some versions of those implementations, the assistant input may be embodied in a spoken utterance provided by the user, and the spoken utterance may not identify any of the natural language content being rendered at the interface of the application.

In some implementations, a method implemented by one or more processors is provided, and includes receiving, by an application, a user input directed to the application. The application is accessible via a computing device that also provides access to an automated assistant. The method further includes causing, based on the user input, the application to perform one or more operations. Performing the one or more operations causes the application to transition from a first operating state to a second operating state. The method further includes receiving, by the application, a request from the automated assistant to perform one or more other operations. The request from the automated assistant is based on an assistant input from a user to the automated assistant. The method further includes causing, based on the request from the automated assistant, the application to revert from the second operating state to the first operating state.

These and other implementations of technology disclosed herein can optionally include one or more of the following features.

In some implementations, the method may further include, prior to receiving the request from the automated assistant, receiving a separate request for the application to provide application state data to the automated assistant. The application state data may characterize one or more features of the first operating state of the application.

In some implementations, the method may further include, prior to receiving the request from the automated assistant, receiving a separate request for the application to provide application operation data to the automated assistant. The application operation data may identify the one or more other operations for reverting the application from the second operating state to the first operating state.

In some implementations, causing the application to revert from the second operating state to the first operating state may include causing the application to modify a file, which is being accessed by the user via the application, to undo the one or more operations that were performed based on the user input.

In some implementations, a method implemented by one or more processors is provided, and includes receiving, by a computing device, an assistant input that is provided by a user to an automated assistant that is accessible via the computing device. The assistant input corresponds to a request to undo particular operations performed by one or more applications that are separate from the automated assistant. The method further includes processing, based on the assistant input, operation data that identifies the particular operations that have affected the one or more applications, and selecting, based on the operation data and the assistant input, one or more operations for the one or more applications to perform. The one or more operations are selected in furtherance of undoing the particular operations performed by the one or more applications. The method further includes causing, by the automated assistant and in response to the assistant input, the one or more applications to perform the one or more operations.

These and other implementations of technology disclosed herein can optionally include one or more of the following features.

In some implementations, the assistant input may be embodied in a spoken utterance provided by the user, and the spoken utterance may be provided simultaneously to the user viewing the one or more applications via an interface of the computing device or a separate computing device.

In some implementations, selecting the one or more operations for the one or more applications to perform may include providing, by the automated assistant, a separate request to an application of the one or more applications using an application programming interface. The request may identify the particular operations that were performed by the one or more applications.

In some implementations, the method may further include selecting, based on the operation data and the assistant input, one or more other operations for the one or more applications to perform. The one or more other operations may be selected in furtherance of undoing the particular operations performed by the one or more applications. The method may further include causing a selection prompt to be rendered for the user. The selection prompt may include a first selectable option that characterizes a first state in which the one or more applications are affected by the one or more operations, and a second selectable option that characterizes a second state in which the one or more applications are affected by the one or more other operations. The user may select the first selectable option in response to the selection prompt being rendered for the user.

In some versions of those implementations, causing the selection prompt to be rendered may include generating a selectable graphical user interface (GUI) element that corresponds to the first selectable option and characterizes visual content of the first state of the one or more applications, and generating another selectable GUI element that corresponds to the second selectable option and characterizes other visual content of the second state of the one or more applications.

In additional or alternative versions of those implementations, selecting the one or more operations for the one or more applications to perform may include accessing a trained machine learning model that is trained based on prior instances in which the user or another user caused the one or more applications, or a separate instance of the one or more applications, to revert to a particular operating state. The one or more operations may be performed based on the trained machine learning model. In some further versions of those implementations, the method may further include generating, based on the user selecting the first selectable option, feedback data, and causing the trained machine learning model to be further trained based on the feedback data.

In some implementations, the method may further include processing, based on the assistant input, contextual data that characterizes one or more features of an environment in which the user provided the assistant input. Selecting the one or more operations for the one or more applications to perform may be further based on the contextual data.

In some implementations, a method implemented by one or more processors is provided, and includes receiving, by a computing device, an assistant input that is provided by a user to an automated assistant that is accessible via the computing device, determining, by the automated assistant, that the assistant input corresponds to a request to undo certain operations performed by a smart device that is associated with an application, and identifying, based on the assistant input, one or more operations that have affected a state of the smart device and are associated with the assistant input. The one or more operations caused the smart device to transition from a first smart device state to a second smart device state, and the user provided the assistant input during, or subsequent to, the smart device exhibiting the second smart device state. The method may further include causing, based on the assistant input, the smart device to revert to the first smart device state in response to receiving the assistant input.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

We claim:

1. A method implemented by one or more processors, the method comprising:
   receiving a user input that is directed to a third-party calendar application via a first-party automated assistant, the user input including a request for the third-party calendar application to perform one or more operations,
      wherein the first-party automated assistant is accessible via a computing device,
      wherein the third-party calendar application is also accessible via the computing device,
      wherein the third-party calendar application is maintained by a third-party entity that differs from a first-party entity that maintains the first-party automated assistant, and
      wherein the request to perform one or more of the operations includes a request to create an event via the third-party calendar application;
   causing, based on the user input, the third-party calendar application to perform one or more of the operations,
      wherein causing the third-party calendar application to perform one or more of the operations causes the third-party calendar application to transition from a first operating state to a second operating state, and
      wherein causing the third-party calendar application to transition from the first operating state to the second operating state causes the third-party calendar application to create the event in a third-party calendar of the third-party calendar application;
   receiving an additional user input that is directed to the third-party calendar application via the first-party automated assistant, the additional user input including an additional request for the third-party calendar application to undo performance of one or more of the operations;
   determining one or more additional operations, that are in addition to the one or more operations, that cause the third-party calendar application to revert from the second operating state and back to the first operating state,
      wherein determining the one or more additional operations that cause the third-party calendar application to revert from the second operating state and back to the first operating state comprises:
         processing, using a trained machine learning model that is trained based on prior instances in which the user or another user cause the third-party calendar application to revert from the second operating state and back to the first operating state, application data and log data for the third-party calendar application to generate output,
            wherein the application data characterizes a plurality of operations that are capable of being performed by the third-party calendar application, and
            wherein the log data characterizes the one or more operations that caused the third-party calendar application to transition from the first operating state to the second operating state; and
         determining, based on the output, the one or more additional operations that cause the third-party calendar application to revert from the second operating state and back to the first operating state;
   causing a selection prompt to be rendered for presentation to the user, wherein the selection prompt includes at least a first selectable option that identifies one or more of the additional operations;
   receiving a user selection of the first selectable option in response to the selection prompt being rendered for presentation to the user; and
   determining, based on the user selection, the one or more additional operations that cause the third-party calendar application to revert from the second operating state and back to the first operating state; and
   causing, based on the user selection, the third-party calendar application to undo performance of one or more of the operations,
      wherein causing the third-party calendar application to undo performance of one or more of the operations causes the third-party calendar application to revert from the second operating state and back to the first operating state, and
      wherein causing the third-party calendar application to revert from the second operating state and back to the first operating state causes the third-party calendar application to remove the event from the third-party calendar of the third-party calendar application.

2. The method of claim 1, wherein causing the third-party calendar application to revert from the second operating state and back to the first operating state comprises:
   causing the third-party calendar application to modify a file, which is being accessed by the user via the third-party calendar application, to undo one or more of the operations that were performed based on the user input.

3. The method of claim 1,
   wherein the request to perform one or more of the operations further includes a request to create an additional event, that is in addition to the event, via the third-party calendar application,
   wherein causing the third-party calendar application to perform one or more of the operations further causes the third-party calendar application to transition from the second operating state to a third operating state, and
   wherein causing the third-party calendar application to transition from the second operating state to the third operating state causes the third-party calendar application to create the additional event in the third-party calendar of the third-party calendar application.

4. The method of claim 3,
   wherein causing the third-party calendar application to undo performance of one or more of the operations further causes the third-party calendar application to revert from the third operating state and back to the first operating state, and
   wherein causing the third-party calendar application to revert from the third operating state and back to the first operating state causes the third-party calendar application to remove the additional event from the third-party calendar of the third-party calendar application.

5. A system comprising:
   at least one processor; and
   memory storing instructions that, when executed, cause the at least one processor to be operable to:
      receive a user input that is directed to a third-party calendar application via a first-party automated assistant, the user input including a request for the third-party calendar application to perform one or more operations,
  wherein the first-party automated assistant is accessible via a computing device,
  wherein the third-party calendar application is also accessible via the computing device,
  wherein the third-party calendar application is maintained by a third-party entity that differs from a first-party entity that maintains the first-party automated assistant, and
  wherein the request to perform one or more of the operations includes a request to create an event via the third-party calendar application;
cause, based on the user input, the third-party calendar application to perform one or more of the operations,
  wherein, in causing the third-party calendar application to perform one or more of the operations, the at least one processor is operable to cause the third-party calendar application to transition from a first operating state to a second operating state, and
  wherein causing the third-party calendar application to transition from the first operating state to the second operating state causes the third-party calendar application to create the event in a third-party calendar of the third-party calendar application;
receive an additional user input that is directed to the third-party calendar application via the first-party automated assistant, the additional user input including an additional request for the third-party calendar application to undo performance of one or more of the operations; and
determine one or more additional operations, that are in addition to the one or more operations, that cause the third-party calendar application to revert from the second operating state and back to the first operating state, wherein the instructions to determine the one or more additional operations that cause the third-party calendar application to revert from the second operating state and back to the first operating state comprise instructions to:
  process, using a trained machine learning model that is trained based on prior instances in which the user or another user cause the third-party calendar application to revert from the second operating state and back to the first operating state, application data and log data for the third-party calendar application to generate output,
    wherein the application data characterizes a plurality of operations that are capable of being performed by the third-party calendar application, and
    wherein the log data characterizes the one or more operations that caused the third-party calendar application to transition from the first operating state to the second operating state; and
  determine, based on the output, the one or more additional operations that cause the third-party calendar application to revert from the second operating state and back to the first operating state;
cause a selection prompt to be rendered for presentation to the user, wherein the selection prompt includes at least a first selectable option that identifies one or more of the additional operations;
  receive a user selection of the first selectable option in response to the selection prompt being rendered for presentation to the user; and
  determine, based on the user selection, the one or more additional operations that cause the third-party calendar application to revert from the second operating state and back to the first operating state;
cause, based on the user selection, the third-party calendar application to undo performance of one or more of the operations,
  wherein, in causing the third-party calendar application to undo performance of one or more of the operations, the at least one processor is operable to cause the third-party calendar application to revert from the second operating state and back to the first operating state, and
  wherein causing the third-party calendar application to revert from the second operating state and back to the first operating state causes the third-party calendar application to remove the event from the third-party calendar of the third-party calendar application.

6. The system of claim 5, wherein, in causing the third-party calendar application to revert from the second operating state and back to the first operating state, the at least one processor is operable to:
  cause the third-party calendar application to modify a file, which is being accessed by the user via the third-party calendar application, to undo one or more of the operations that were performed based on the user input.

7. The system of claim 5,
  wherein the request to perform one or more of the operations further includes a request to create an additional event, that is in addition to the event, via the third-party calendar application,
  wherein causing the third-party calendar application to perform one or more of the operations further causes the third-party calendar application to transition from the second operating state to a third operating state, and
  wherein causing the third-party calendar application to transition from the second operating state to the third operating state causes the third-party calendar application to create the additional event in the third-party calendar of the third-party calendar application.

8. The system of claim 7,
  wherein causing the third-party calendar application to undo performance of one or more of the operations further causes the third-party calendar application to revert from the third operating state and back to the first operating state, and
  wherein causing the third-party calendar application to revert from the third operating state and back to the first operating state causes the third-party calendar application to remove the additional event from the third-party calendar of the third-party calendar application.

9. A non-transitory computer-readable storage medium storing instructions that, when executed, cause the at least one processor to perform operations, the operations comprising:
  receiving a user input that is directed to a third-party calendar application via a first-party automated assistant, the user input including a request for the third-party calendar application to perform one or more operations,
    wherein the first-party automated assistant is accessible via a computing device, wherein the third-party calendar application is also accessible via the computing device, wherein the third-party calendar application is maintained by a third-party entity that differs from a first-party entity that maintains the first-party automated assistant, and wherein the request to perform one or more of the operations includes a request to create an event via the third-party calendar application;

causing, based on the user input, the third-party calendar application to perform one or more of the operations, wherein causing the third-party calendar application to perform one or more of the operations causes the third-party calendar application to transition from a first operating state to a second operating state, and wherein causing the third-party calendar application to transition from the first operating state to the second operating state causes the third-party calendar application to create the event in a third-party calendar of the third-party calendar application;

receiving an additional user input that is directed to the third-party calendar application via the first-party automated assistant, the additional user input including an additional request for the third-party calendar application to undo performance of one or more of the operations;

determining one or more additional operations, that are in addition to the one or more operations, that cause the third-party calendar application to revert from the second operating state and back to the first operating state, wherein determining the one or more additional operations that cause the third-party calendar application to revert from the second operating state and back to the first operating state comprises:

processing, using a trained machine learning model that is trained based on prior instances in which the user or another user cause the third-party calendar application to revert from the second operating state and back to the first operating state, application data and log data for the third-party calendar application to generate output, wherein the application data characterizes a plurality of operations that are capable of being performed by the third-party calendar application, and wherein the log data characterizes the one or more operations that caused the third-party calendar application to transition from the first operating state to the second operating state; and determining, based on the output, the one or more additional operations that cause the third-party calendar application to revert from the second operating state and back to the first operating state;

causing a selection prompt to be rendered for presentation to the user, wherein the selection prompt includes at least a first selectable option that identifies one or more of the additional operations;

receiving a user selection of the first selectable option in response to the selection prompt being rendered for presentation to the user; and determining, based on the user selection, the one or more additional operations that cause the third-party calendar application to revert from the second operating state and back to the first operating state; and causing, based on the user selection, the third-party calendar application to undo performance of one or more of the operations, wherein causing the third-party calendar application to undo performance of one or more of the operations causes the third-party calendar application to revert from the second operating state and back to the first operating state, and wherein causing the third-party calendar application to revert from the second operating state and back to the first operating state causes the third-party calendar application to remove the event from the third-party calendar of the third-party calendar application.

10. The non-transitory computer-readable medium of claim 9, wherein causing the third-party calendar application to revert from the second operating state and back to the first operating state comprises:

causing the third-party calendar application to modify a file, which is being accessed by the user via the third-party calendar application, to undo one or more of the operations that were performed based on the user input.

11. The non-transitory computer-readable medium of claim 9, wherein the request to perform one or more of the operations further includes a request to create an additional event, that is in addition to the event, via the third-party calendar application, wherein causing the third-party calendar application to perform one or more of the operations further causes the third-party calendar application to transition from the second operating state to a third operating state, and wherein causing the third-party calendar application to transition from the second operating state to the third operating state causes the third-party calendar application to create the additional event in the third-party calendar of the third-party calendar application.

12. The non-transitory computer-readable medium of claim 11, wherein causing the third-party calendar application to undo performance of one or more of the operations further causes the third-party calendar application to revert from the third operating state and back to the first operating state, and wherein causing the third-party calendar application to revert from the third operating state and back to the first operating state causes the third-party calendar application to remove the additional event from the third-party calendar of the third-party calendar application.

\* \* \* \* \*